US009563654B2

(12) United States Patent
Zheng et al.

(10) Patent No.: US 9,563,654 B2
(45) Date of Patent: *Feb. 7, 2017

(54) DENSE TREE VOLUME METADATA ORGANIZATION

(71) Applicant: NetApp, Inc., Sunnyvale, CA (US)

(72) Inventors: Ling Zheng, Saratoga, CA (US); Blake H. Lewis, Los Altos Hills, CA (US); Kayuri H. Patel, Cupertino, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/978,290

(22) Filed: Dec. 22, 2015

(65) Prior Publication Data

US 2016/0110392 A1    Apr. 21, 2016

Related U.S. Application Data

(63) Continuation of application No. 14/027,994, filed on Sep. 16, 2013, now Pat. No. 9,268,502.

(51) Int. Cl.
*G06F 3/06* (2006.01)
*G06F 17/30* (2006.01)

(52) U.S. Cl.
CPC ......... *G06F 17/30327* (2013.01); *G06F 3/067* (2013.01); *G06F 3/0611* (2013.01); *G06F 3/0619* (2013.01); *G06F 3/0638* (2013.01); *G06F 3/0655* (2013.01); *G06F 3/0665* (2013.01); *G06F 3/0689* (2013.01); *G06F 17/30292* (2013.01); *G06F 3/0641* (2013.01); *G06F 17/30* (2013.01)

(58) Field of Classification Search
CPC ..... G06F 3/0689; G06F 3/0619; G06F 3/0665
See application file for complete search history.

(56) References Cited

U.S. PATENT DOCUMENTS 5,937,425 A    8/1999  Ban
7,249,150 B1   7/2007  Watanabe et al.
(Continued)

FOREIGN PATENT DOCUMENTS

EP    2735978 A1    5/2014

OTHER PUBLICATIONS

Cornwall, Michael, "Anatomy of a Solid-state Drive," ACM Queue—Networks, vol. 10, No. 10, Oct. 2012, pp. 1-7.
(Continued)

*Primary Examiner* — Henry Tsai
*Assistant Examiner* — John Roche
(74) *Attorney, Agent, or Firm* — Cesari and McKenna, LLP

(57) ABSTRACT

The embodiments described herein are directed to an organization of metadata managed by a volume layer of a storage input/output (I/O) stack executing on one or more nodes of a cluster. The metadata managed by the volume layer, i.e., the volume metadata, is illustratively embodied as mappings from addresses, i.e., logical block addresses (LBAs), of a logical unit (LUN) accessible by a host to durable extent keys maintained by an extent store layer of the storage I/O stack. In an embodiment, the volume layer organizes the volume metadata as a mapping data structure, i.e., a dense tree metadata structure, which represents successive points in time to enable efficient access to the metadata.

20 Claims, 13 Drawing Sheets

(56) References Cited

U.S. PATENT DOCUMENTS

| | | | |
|---|---|---|---|
| 7,464,125 | B1 | 12/2008 | Orzag et al. |
| 7,562,101 | B1 | 7/2009 | Jernigan et al. |
| 7,562,203 | B2 | 7/2009 | Scott et al. |
| 7,668,885 | B2 | 2/2010 | Wittke et al. |
| 7,680,837 | B2 | 3/2010 | Yamato |
| 7,743,035 | B2 | 6/2010 | Chen et al. |
| 7,873,619 | B1 | 1/2011 | Faibish et al. |
| 7,996,636 | B1 | 8/2011 | Prakash et al. |
| 8,082,390 | B1 | 12/2011 | Fan et al. |
| 8,099,396 | B1 | 1/2012 | Novick et al. |
| 8,205,065 | B2 | 6/2012 | Matze |
| 8,341,457 | B2 | 12/2012 | Spry et al. |
| 8,417,987 | B1 | 4/2013 | Goel et al. |
| 8,463,825 | B1 | 6/2013 | Harty et al. |
| 8,489,811 | B1 | 7/2013 | Corbett et al. |
| 8,495,417 | B2 | 7/2013 | Jernigan, IV et al. |
| 8,539,008 | B2 | 9/2013 | Faith et al. |
| 8,560,879 | B1 | 10/2013 | Goel |
| 8,595,595 | B1 | 11/2013 | Grcanac et al. |
| 9,268,502 | B2 * | 2/2016 | Zheng ............... G06F 17/30327 |
| 2003/0120869 | A1 | 6/2003 | Lee et al. |
| 2003/0159007 | A1 | 8/2003 | Sawdon et al. |
| 2005/0144514 | A1 | 6/2005 | Ulrich et al. |
| 2006/0288151 | A1 | 12/2006 | McKenney |
| 2007/0143359 | A1 | 6/2007 | Uppala |
| 2008/0127211 | A1 | 5/2008 | Belsey et al. |
| 2009/0031083 | A1 | 1/2009 | Willis et al. |
| 2009/0037500 | A1 | 2/2009 | Kirshenbaum |
| 2010/0042790 | A1 | 2/2010 | Mondal et al. |
| 2010/0057792 | A1 | 3/2010 | Ylonen |
| 2010/0077380 | A1 | 3/2010 | Baker et al. |
| 2010/0088296 | A1 | 4/2010 | Periyagaram et al. |
| 2010/0228795 | A1 | 9/2010 | Hahn et al. |
| 2011/0035548 | A1 | 2/2011 | Kimmel et al. |
| 2011/0066808 | A1 | 3/2011 | Flynn et al. |
| 2011/0072008 | A1 | 3/2011 | Mandal |
| 2011/0099342 | A1 | 4/2011 | Ozdemir |
| 2011/0213928 | A1 | 9/2011 | Grube et al. |
| 2012/0011176 | A1 | 1/2012 | Alzman |
| 2012/0290788 | A1 | 11/2012 | Klemm et al. |
| 2013/0018854 | A1 | 1/2013 | Condict |
| 2013/0138862 | A1 | 5/2013 | Motwani et al. |
| 2013/0227236 | A1 | 8/2013 | Flynn et al. |
| 2013/0238832 | A1 | 9/2013 | Dronamraju et al. |
| 2013/0238932 | A1 | 9/2013 | Resch |
| 2013/0268497 | A1 | 10/2013 | Baldwin et al. |
| 2013/0346810 | A1 | 12/2013 | Kimmel et al. |

OTHER PUBLICATIONS

"Cuckoo hashing," Wikipedia, http://en.wikipedia.org/wiki/Cuckoo_hash, Apr. 2013, pp. 1-5.

Culik, K., et al., "Dense Multiway Trees," ACM Transactions on Database Systems, vol. 6, Issue 3, Sep. 1981, pp. 486-512.

Debnath, Biplob, et al., "FlashStore:.High Throughput Persistent Key-Value Store," Proceedings of the VLDB Endowment VLDB Endowment, vol. 3, Issue 1-2, Sep. 2010, pp. 1414-1425.

Gal, Eran et al., "Algorithms and Data Structures for Flash Memories," ACM Computing Surveys, vol. 37, No. 2, Jun. 2005, pp. 138-163.

Gray, Jim et al., "Flash Disk Opportunity for Server Applications," Queue—Enterprise Flash Storage, vol. 6, Issue 4, Jul.-Aug. 2008, pp. 18-23.

Handy, Jim, "SSSI Tech Notes: How Controllers Maximize SSD Life," SNIA, Jan. 2013, pp. 1-20.

Leventhal, Adam H., "A File System All Its Own," Communications of the ACM Queue, vol. 56, No. 5, May 2013, pp. 64-67.

Lim, H. et al., "SILT: A Memory-Efficient, High-Performance Key-Value Store," Proceedings of the $23^{rd}$ ACM Symposium on Operating Systems Principles (SOSP'11), Oct. 23-26, 2011, pp. 1-13.

Moshayedi, Mark, et al., "Enterprise SSDs," ACM Queue—Enterprise Flash Storage, vol. 6 No. 4, Jul.-Aug. 2008, pp. 32-39.

Pagh, Rasmus, et al., "Cuckoo Hashing," Elsevier Science, Dec. 8, 2003, pp. 1-27.

Pagh, Rasmus, "Cuckoo Hashing for Undergraduates," IT University of Copenhagen, Mar. 27, 2006, pp. 1-6.

Rosenblum, Mendel, et al., "The Design and Implementation of a Log-Structured File System," Proceedings of the $13^{th}$ ACM Symposium on Operating Systems Principles, Jul. 24, 1991, pp. 1-15.

Rosenblum, Mendel, et al., "The LFS Storage Manager," Summer '90 USENIX Technical Conference, Anaheim, California, Jun. 1990, pp. 1-16.

Rosenblum, Mendel, "The Design and Implementation of a Log-structured File System," UC Berkeley, Thesis, 1992, pp. 1-101.

Seltzer, Margo, et al., "An Implementation of a Log Structured File System for UNIX," Winter USENIX, San Diego, CA, Jan. 25-29, 1993, pp. 1-18.

Seltzer, Margo, et al., "File System Performance and Transaction Support," UC Berkeley, Thesis, 1992, pp. 1-131.

Smith, Kent, "Garbage Collection," SandForce, Flash Memory Summit, Santa Clara, CA, Aug. 2011, pp. 1-9.

Twigg, Andy, et al., "Stratified B-trees and Versioned Dictionaries," Proceedings of the 3rd USENIX Conference on Hot Topics in Storage and File Systems, vol. 11, 2011, pp. 1-5.

Wu, Po-Liang, et al., "A File-System-Aware FTL Design for Flash-Memory Storage Systems," Design, Automation & Test in Europe Conference & Exhibition, IEEE, 2009, pp. 1-6.

Art S. Kagel, "two-way merge sort", Dictionary of Algorithms and Data Structures [online], May 2005 [retrieved on Jan. 28, 2015]. Retrieved from the Internet:< URL: http://xlinux.nist.gov/dads/HTMUtwowaymrgsrt.html>, 1 page.

Patrick O'Neil, Edward Cheng, Dieter Gawlick, and Elizabeth O'Neil. The log-structured merge-tree (LSM-tree). Acta Informatica33. pp. 351-385. 1996.

"Notification of Transmittal of the International Search Report and the Written Opinion of the International Searching Authority, or the Declaration", PCT Application No. PCT/US2014/055138, issued by the European Patent Office, Dec. 12, 2014, 13 pages.

O'Neil, et al. "The log-structured merge-tree (LSM-tree)." Acta Informatica 33.4 (1996): 351-385.

Sears, et al. "bLSM: a general purpose log structured merge tree." Proceedings of the 2012 ACM SIGMOD International Conference on Management of Data. ACM, 2012. (12 pages).

* cited by examiner

DENSE TREE VOLUME METADATA ORGANIZATION

CROSS-REFERENCE TO RELATED APPLICATIONS

The present application is a continuation of U.S. patent application Ser. No. 14/027,994, entitled Dense Tree Volume Metadata Organization, filed on Sep. 16, 2013 by Ling Zheng et al., and is related to U.S. patent application Ser. No. 14/162,228, filed on Jan. 23, 2014, entitled Dense Tree Volume Metadata Organization, by Ling Zheng et al., now issued as U.S. Pat. No. 8,892,818 on Nov. 18, 2014, which applications are hereby incorporated by reference. The present application is also related to U.S. Pat. No. 8,996,797 entitled Dense Tree Volume Metadata Update Logging and Checkpointing, by Ling Zheng et al., issued on Mar. 31, 2015.

BACKGROUND

Technical Field

The present disclosure relates to storage systems and, more specifically, to the organization of metadata among storage systems configured to provide a distributed storage architecture of a cluster.

Background Information

A plurality of storage systems may be interconnected as a cluster and configured to provide storage service relating to the organization of storage containers stored on storage devices coupled to the systems. The storage system cluster may be further configured to operate according to a client/server model of information delivery to thereby allow one or more clients (hosts) to access the storage containers. The storage devices may be embodied as solid-state drives (SSDs), such as flash storage devices, whereas the storage containers may be embodied as files or logical units (LUNs). Each storage container may be implemented as a set of data structures, such as data blocks that store data for the storage container and metadata blocks that describe the data of the storage container. For example, the metadata may describe, e.g., identify, locations of the data throughout the cluster.

The data of the storage containers accessed by a host may be stored on any of the storage systems of the cluster; moreover, the locations of the data may change throughout the cluster. Therefore, the storage systems may maintain metadata describing the locations of the storage container data throughout the cluster. However, it may be generally cumbersome to update the metadata every time the location of storage container data changes. One way to avoid such cumbersome updates is to maintain the metadata in a data structure that is efficiently accessed to resolve locations of the data. Accordingly, it is desirable to provide an organization of the metadata that enables efficient determination of the location of storage container data in a storage system cluster. In addition, it is desirable to provide a metadata organization that is "friendly" to, i.e., exploits the performance of, the storage devices configured to store the metadata.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

DESCRIPTION OF ILLUSTRATIVE EMBODIMENTS

The embodiments described herein are directed to an organization of metadata managed by a volume layer of a storage input/output (I/O) stack executing on one or more nodes of a cluster. The metadata managed by the volume layer, i.e., the volume metadata, is illustratively embodied as mappings from addresses, i.e., logical block addresses (LBAs), of a logical unit (LUN) accessible by a host to durable extent keys maintained by an extent store layer of the storage I/O stack. Each extent key is a unique cluster-wide identifier associated with a storage location for an extent, which is a variable length block of data that may be aggregated from one or more write requests directed to a LBA range of the LUN. In an embodiment, the volume layer organizes the volume metadata as a mapping data structure, i.e., a dense tree metadata structure, which represents successive points in time to enable efficient access to the metadata.

Illustratively, the dense tree metadata structure is organized as a multi-level dense tree, where a top level represents recent volume metadata changes and subsequent descending levels represent older changes. A latest version of the changes may be searched starting at the top level of the dense tree and working down to the descending levels. Each level of the dense tree may include fixed size records or entries, i.e., volume metadata entries, for storing the volume metadata. The volume metadata entries provide the mappings from the host-accessible LBAs to the extent keys. The top level of the dense tree is illustratively maintained in memory as a balanced tree that enables indexing by offsets. Each level of the dense tree is further maintained on one or more storage devices as a packed array of volume metadata entries. Each volume metadata entry may be a descriptor that embodies one of a plurality of types, including a data entry, an index entry, and a hole entry. The data entry is configured to map (offset, length) to an extent key for an extent, whereas the index entry is configured to map (offset, length)

to a page key of a metadata page at a next lower level of the dense tree. Illustratively, the index entry serves as linkage between the levels of the dense tree. The hole entry represents a hole punching operation at (offset, length).

DESCRIPTION

Storage Cluster

Figure 1:
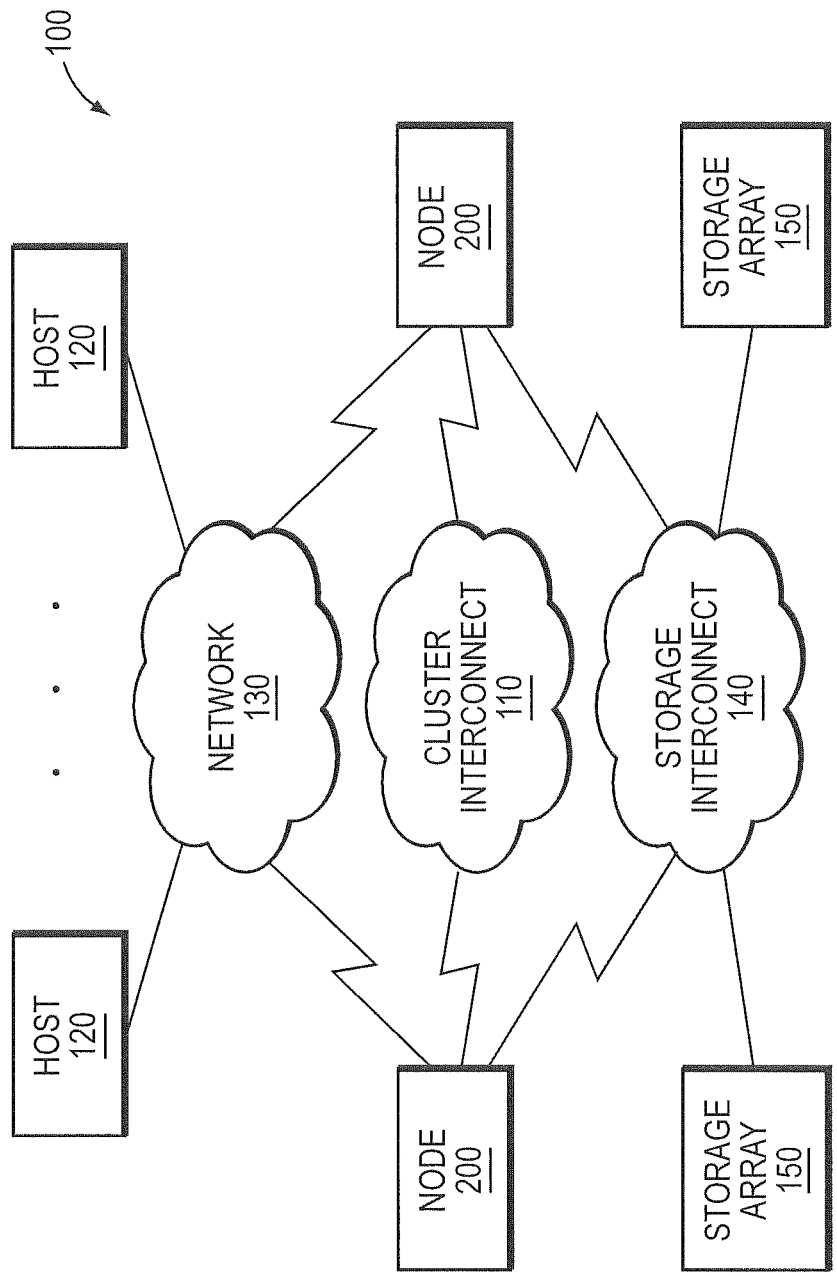
FIG. 1 is a block diagram of a plurality of nodes interconnected as a cluster.

FIG. 1 is a block diagram of a plurality of nodes 200 interconnected as a cluster 100 and configured to provide storage service relating to the organization of information on storage devices. The nodes 200 may be interconnected by a cluster interconnect fabric 110 and include functional components that cooperate to provide a distributed storage architecture of the cluster 100, which may be deployed in a storage area network (SAN). As described herein, the components of each node 200 include hardware and software functionality that enable the node to connect to one or more hosts 120 over a computer network 130, as well as to one or more storage arrays 150 of storage devices over a storage interconnect 140, to thereby render the storage service in accordance with the distributed storage architecture.

Each host 120 may be embodied as a general-purpose computer configured to interact with any node 200 in accordance with a client/server model of information delivery. That is, the client (host) may request the services of the node, and the node may return the results of the services requested by the host, by exchanging packets over the network 130. The host may issue packets including file-based access protocols, such as the Network File System (NFS) protocol over the Transmission Control Protocol/Internet Protocol (TCP/IP), when accessing information on the node in the form of storage containers such as files and directories. However, in an embodiment, the host 120 illustratively issues packets including block-based access protocols, such as the Small Computer Systems Interface (SCSI) protocol encapsulated over TCP (iSCSI) and SCSI encapsulated over FC (FCP), when accessing information in the form of storage containers such as logical units (LUNs). Notably, any of the nodes 200 may service a request directed to a storage container on the cluster 100.

Figure 2:
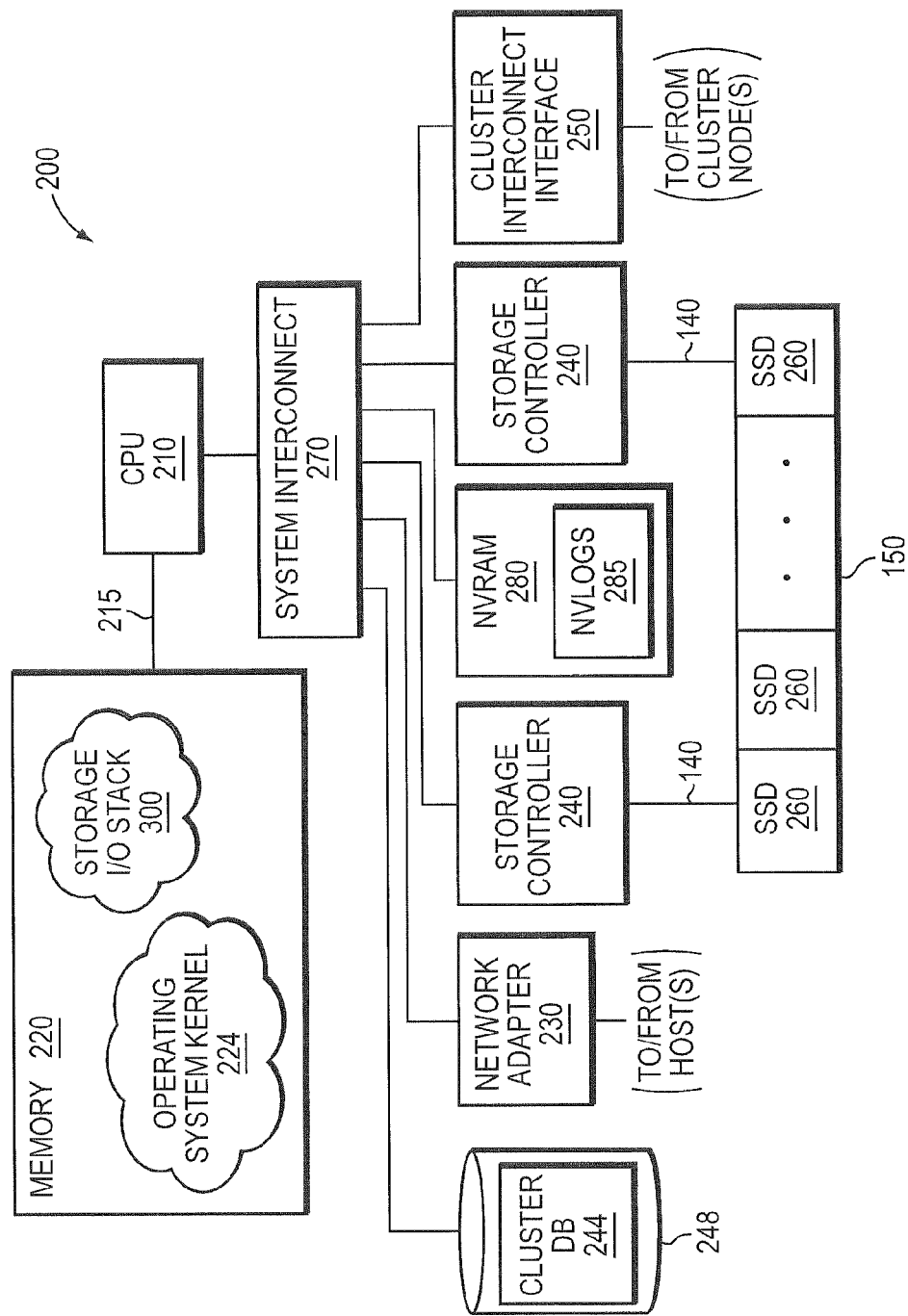
FIG. 2 is a block diagram of a node.

FIG. 2 is a block diagram of a node 200 that is illustratively embodied as a storage system having one or more central processing units (CPUs) 210 coupled to a memory 220 via a memory bus 215. The CPU 210 is also coupled to a network adapter 230, one or more storage controllers 240, a cluster interconnect interface 250 and a non-volatile random access memory (NVRAM 280) via a system interconnect 270. The network adapter 230 may include one or more ports adapted to couple the node 200 to the host(s) 120 over computer network 130, which may include point-to-point links, wide area networks, virtual private networks implemented over a public network (Internet) or a local area network. The network adapter 230 thus includes the mechanical, electrical and signaling circuitry needed to connect the node to the network 130, which illustratively embodies an Ethernet or Fibre Channel (FC) network.

The memory 220 may include memory locations that are addressable by the CPU 210 for storing software programs and data structures associated with the embodiments described herein. The CPU 210 may, in turn, include processing elements and/or logic circuitry configured to execute the software programs, such as a storage input/output (I/O) stack 300, and manipulate the data structures. Illustratively, the storage I/O stack 300 may be implemented as a set of user mode processes that may be decomposed into a plurality of threads. An operating system kernel 224, portions of which are typically resident in memory 220 (in-core) and executed by the processing elements (i.e., CPU 210), functionally organizes the node by, inter alia, invoking operations in support of the storage service implemented by the node and, in particular, the storage I/O stack 300. A suitable operating system kernel 224 may include a general-purpose operating system, such as the UNIX® series or Microsoft Windows® series of operating systems, or an operating system with configurable functionality such as microkernels and embedded kernels. However, in an embodiment described herein, the operating system kernel is illustratively the Linux® operating system. It will be apparent to those skilled in the art that other processing and memory means, including various computer readable media, may be used to store and execute program instructions pertaining to the embodiments herein.

Each storage controller 240 cooperates with the storage I/O stack 300 executing on the node 200 to access information requested by the host 120. The information is preferably stored on storage devices such as solid state drives (SSDs) 260, illustratively embodied as flash storage devices, of storage array 150. In an embodiment, the flash storage devices may be based on NAND flash components, e.g., single-layer-cell (SLC) flash, multi-layer-cell (MLC) flash or triple-layer-cell (TLC) flash, although it will be understood to those skilled in the art that other block-oriented, non-volatile, solid-state electronic devices (e.g., drives based on storage class memory components) may be advantageously used with the embodiments described herein. Accordingly, the storage devices may or may not be block-oriented (i.e., accessed as blocks). The storage controller 240 includes one or more ports having I/O interface circuitry that couples to the SSDs 260 over the storage interconnect 140, illustratively embodied as a serial attached SCSI (SAS) topology. Alternatively, other point-to-point I/O interconnect arrangements, such as a conventional serial ATA (SATA) topology or PCI topology, may be used. The system interconnect 270 may also couple the node 200 to a local service storage device 248, such as an SSD, configured to locally store cluster-related configuration information, e.g., as cluster database (DB) 244, which may be replicated to the other nodes 200 in the cluster 100.

The cluster interconnect interface 250 may include one or more ports adapted to couple the node 200 to the other node(s) of the cluster 100. In an embodiment, Ethernet may be used as the clustering protocol and interconnect fabric media, although it will be apparent to those skilled in the art that other types of protocols and interconnects, such as Infiniband, may be utilized within the embodiments described herein. The NVRAM 280 may include a back-up battery or other built-in last-state retention capability (e.g., non-volatile semiconductor memory such as storage class memory) that is capable of maintaining data in light of a failure to the node and cluster environment. Illustratively, a portion of the NVRAM 280 may be configured as one or more non-volatile logs (NVLogs 285) configured to temporarily record ("log") I/O requests, such as write requests, received from the host 120.

Storage I/O Stack

Figure 3:
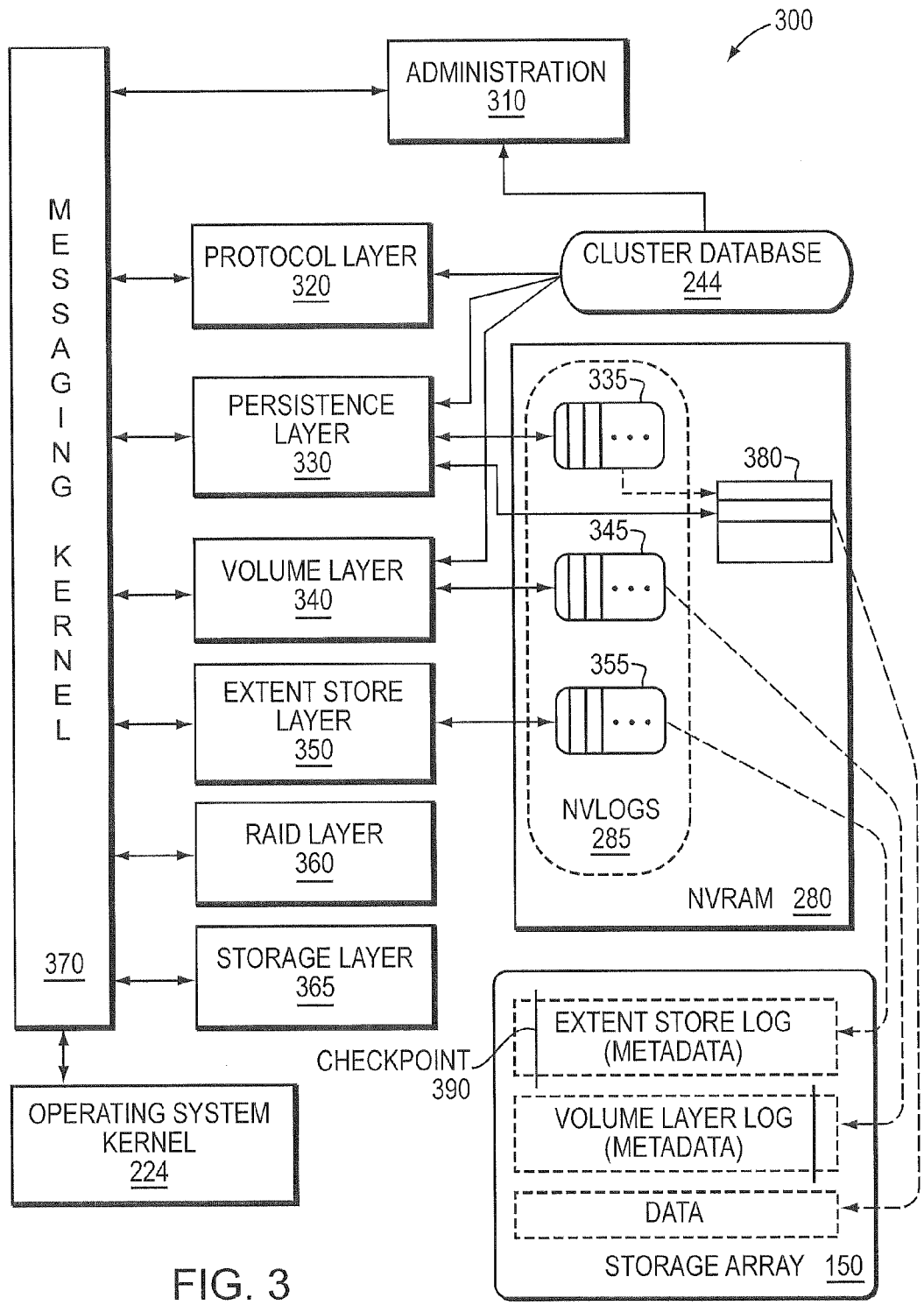
FIG. 3 is a block diagram of a storage input/output (I/O) stack of the node.

FIG. 3 is a block diagram of the storage I/O stack 300 that may be advantageously used with one or more embodiments described herein. The storage I/O stack 300 includes a plurality of software modules or layers that cooperate with other functional components of the nodes 200 to provide the distributed storage architecture of the cluster 100. In an embodiment, the distributed storage architecture presents an abstraction of a single storage container, i.e., all of the storage arrays 150 of the nodes 200 for the entire cluster 100 organized as one large pool of storage. In other words, the architecture consolidates storage, i.e., the SSDs 260 of the arrays 150, throughout the cluster (retrievable via cluster-wide keys) to enable storage of the LUNs. Both storage capacity and performance may then be subsequently scaled by adding nodes 200 to the cluster 100.

Illustratively, the storage I/O stack 300 includes an administration layer 310, a protocol layer 320, a persistence layer 330, a volume layer 340, an extent store layer 350, a Redundant Array of Independent Disks (RAID) layer 360, a storage layer 365 and a NVRAM (storing NVLogs) "layer" interconnected with a messaging kernel 370. The messaging kernel 370 may provide a message-based (or event-based) scheduling model (e.g., asynchronous scheduling) that employs messages as fundamental units of work exchanged (i.e., passed) among the layers. Suitable message-passing mechanisms provided by the messaging kernel to transfer information between the layers of the storage I/O stack 300 may include, e.g., for intra-node communication: i) messages that execute on a pool of threads, ii) messages that execute on a single thread progressing as an operation through the storage I/O stack, iii) messages using an Inter Process Communication (IPC) mechanism and, e.g., for inter-node communication: messages using a Remote Procedure Call (RPC) mechanism in accordance with a function shipping implementation. Alternatively, the I/O stack may be implemented using a thread-based or stack-based execution model. In one or more embodiments, the messaging kernel 370 allocates processing resources from the operating system kernel 224 to execute the messages. Each storage I/O stack layer may be implemented as one or more instances (i.e., processes) executing one or more threads (e.g., in kernel or user space) that process the messages passed between the layers such that the messages provide synchronization for blocking and non-blocking operation of the layers.

In an embodiment, the protocol layer 320 may communicate with the host 120 over the network 130 by exchanging discrete frames or packets configured as I/O requests according to pre-defined protocols, such as iSCSI and FCP. An I/O request, e.g., a read or write request, may be directed to a LUN and may include I/O parameters such as, inter alia, a LUN identifier (ID), a logical block address (LBA) of the LUN, a length (i.e., amount of data) and, in the case of a write request, write data. The protocol layer 320 receives the I/O request and forwards it to the persistence layer 330, which records the request into a persistent write-back cache 380, illustratively embodied as a log whose contents can be replaced randomly, e.g., under some random access replacement policy rather than only in serial fashion, and returns an acknowledgement to the host 120 via the protocol layer 320. In an embodiment only I/O requests that modify the LUN, e.g., write requests, are logged. Notably, the I/O request may be logged at the node receiving the I/O request, or in an alternative embodiment in accordance with the function shipping implementation, the I/O request may be logged at another node.

Illustratively, dedicated logs may be maintained by the various layers of the storage I/O stack 300. For example, a dedicated log 335 may be maintained by the persistence layer 330 to record the I/O parameters of an I/O request as equivalent internal, i.e., storage I/O stack, parameters, e.g., volume ID, offset, and length. In the case of a write request, the persistence layer 330 may also cooperate with the NVRAM 280 to implement the write-back cache 380 configured to store the write data associated with the write request. In an embodiment, the write-back cache may be structured as a log. Notably, the write data for the write request may be physically stored in the cache 380 such that the log 335 contains the reference to the associated write data. It will be understood to persons skilled in the art other variations of data structures may be used to store or maintain the write data in NVRAM including data structures with no logs. In an embodiment, a copy of the write-back cache may also be maintained in the memory 220 to facilitate direct memory access to the storage controllers. In other embodiments, caching may be performed at the host 120 or at a receiving node in accordance with a protocol that maintains coherency between the data stored at the cache and the cluster.

In an embodiment, the administration layer 310 may apportion the LUN into multiple volumes, each of which may be partitioned into multiple regions (e.g., allotted as disjoint block address ranges), with each region having one or more segments stored as multiple stripes on the array 150. A plurality of volumes distributed among the nodes 200 may thus service a single LUN, i.e., each volume within the LUN services a different LBA range (i.e., offset range) or set of ranges within the LUN. Accordingly, the protocol layer 320 may implement a volume mapping technique to identify a volume to which the I/O request is directed (i.e., the volume servicing the offset range indicated by the parameters of the I/O request). Illustratively, the cluster database 244 may be configured to maintain one or more associations (e.g., key-value pairs) for each of the multiple volumes, e.g., an association between the LUN ID and a volume, as well as an association between the volume and a node ID for a node managing the volume. The administration layer 310 may also cooperate with the database 244 to create (or delete) one or more volumes associated with the LUN (e.g., creating a volume ID/LUN key-value pair in the database 244). Using the LUN ID and LBA (or LBA range), the volume mapping technique may provide a volume ID (e.g., using appropriate associations in the cluster database 244) that identifies the volume and node servicing the volume destined for the request, as well as translate the LBA (or LBA range) into an offset and length within the volume. Specifically, the volume ID is used to determine a volume layer instance that manages volume metadata associated with the LBA or LBA range. As noted, the protocol layer 320 may pass the I/O request (i.e., volume ID, offset and length) to the persistence layer 330, which may use the function shipping (e.g., inter-node) implementation to forward the I/O request to the appropriate volume layer instance executing on a node in the cluster based on the volume ID.

In an embodiment, the volume layer 340 may manage the volume metadata by, e.g., maintaining states of host-visible containers, such as ranges of LUNs, and performing data management functions, such as creation of snapshots and clones, for the LUNs in cooperation with the administration layer 310. The volume metadata is illustratively embodied as in-core mappings from LUN addresses (i.e., LBAs) to durable extent keys, which are unique cluster-wide IDs associated with SSD storage locations for extents within an extent key space of the cluster-wide storage container. That is, an extent key may be used to retrieve the data of the extent at an SSD storage location associated with the extent key. Alternatively, there may be multiple storage containers in the cluster wherein each container has its own extent key space, e.g., where the administration layer 310 provides distribution of extents among the storage containers. An extent is a variable length block of data that provides a unit of storage on the SSDs and that need not be aligned on any specific boundary, i.e., it may be byte aligned. Accordingly, an extent may be an aggregation of write data from a plurality of write requests to maintain such alignment. Illustratively, the volume layer 340 may record the forwarded request (e.g., information or parameters characterizing the request), as well as changes to the volume metadata, in dedicated log 345 maintained by the volume layer 340. Subsequently, the contents of the volume layer log 345 may be written to the storage array 150 in accordance with a checkpoint (e.g., synchronization) operation that stores in-core metadata on the array 150. That is, the checkpoint operation (checkpoint) ensures that a consistent state of metadata, as processed in-core, is committed to (i.e., stored on) the storage array 150; whereas the retirement of log entries ensures that the entries accumulated in the volume layer log 345 synchronize with the metadata checkpoints committed to the storage array 150 by, e.g., retiring those accumulated log entries that are prior to the checkpoint. In one or more embodiments, the checkpoint and retirement of log entries may be data driven, periodic or both.

In an embodiment, the extent store layer 350 is responsible for storing extents prior to storage on the SSDs 260 (i.e., on the storage array 150) and for providing the extent keys to the volume layer 340 (e.g., in response to a forwarded write request). The extent store layer 350 is also responsible for retrieving data (e.g., an existing extent) using an extent key (e.g., in response to a forwarded read request). The extent store layer 350 may be responsible for performing de-duplication and compression on the extents prior to storage. The extent store layer 350 may maintain in-core mappings (e.g., embodied as hash tables) of extent keys to SSD storage locations (e.g., offset on an SSD 260 of array 150). The extent store layer 350 may also maintain a dedicated log 355 of entries that accumulate requested "put" and "delete" operations (i.e., write requests and delete requests for extents issued from other layers to the extent store layer 350), where these operations change the in-core mappings (i.e., hash table entries). Subsequently, the in-core mappings and contents of the extent store layer log 355 may be written to the storage array 150 in accordance with a "fuzzy" checkpoint 390 (i.e., checkpoint with incremental changes recorded in one or more log files) in which selected in-core mappings, less than the total, are committed to the array 150 at various intervals (e.g., driven by an amount of change to the in-core mappings, size thresholds of log 355, or periodically). Notably, the accumulated entries in log 355 may be retired once all in-core mappings have been committed to include the changes recorded in those entries.

In an embodiment, the RAID layer 360 may organize the SSDs 260 within the storage array 150 as one or more RAID groups (e.g., sets of SSDs) that enhance the reliability and integrity of extent storage on the array by writing data "stripes" having redundant information, i.e., appropriate parity information with respect to the striped data, across a given number of SSDs 260 of each RAID group. The RAID layer 360 may also store a number of stripes (e.g., stripes of sufficient depth), e.g., in accordance with a plurality of contiguous range write operations, so as to reduce data relocation (i.e., internal flash block management) that may occur within the SSDs as a result of the operations.

In an embodiment, the storage layer 365 implements storage I/O drivers that may communicate directly with hardware (e.g., the storage controllers and cluster interface) cooperating with the operating system kernel 224, such as a Linux virtual function I/O (VFIO) driver.

Write Path

Figure 4:
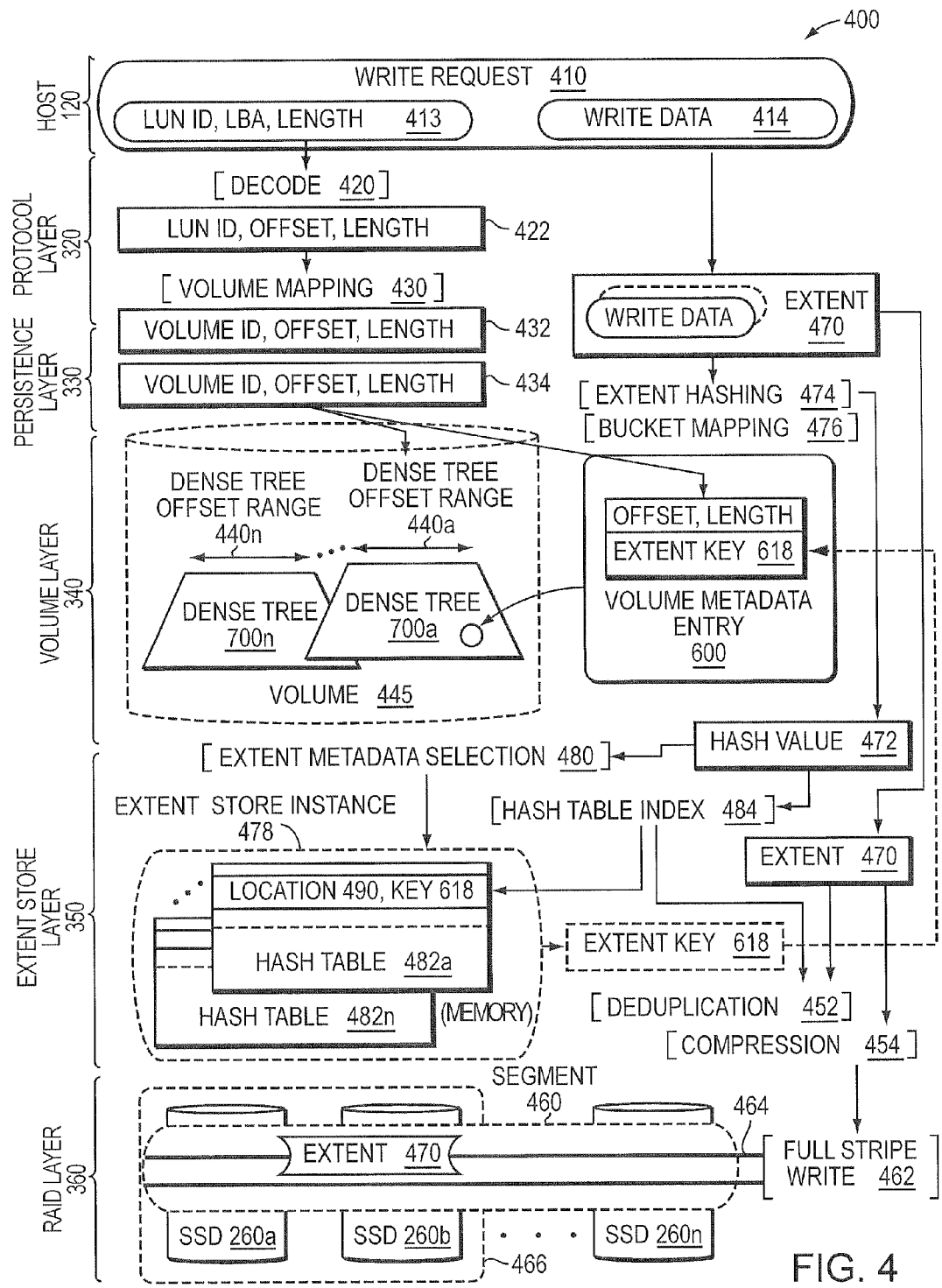
FIG. 4 illustrates a write path of the storage I/O stack.

FIG. 4 illustrates an I/O (e.g., write) path 400 of the storage I/O stack 300 for processing an I/O request, e.g., a SCSI write request 410. The write request 410 may be issued by host 120 and directed to a LUN stored on the storage array 150 of the cluster 100. Illustratively, the protocol layer 320 receives and processes the write request by decoding 420 (e.g., parsing and extracting) fields of the request, e.g., LUN ID, LBA and length (shown at 413), as well as write data 414. The protocol layer 320 may use the results 422 from decoding 420 for a volume mapping technique 430 (described above) that translates the LUN ID and LBA range (i.e., equivalent offset and length) of the write request to an appropriate volume layer instance, i.e., volume ID (volume 445), in the cluster 100 that is responsible for managing volume metadata for the LBA range. In an alternative embodiment, the persistence layer 330 may implement the above described volume mapping technique 430. The protocol layer then passes the results 432, e.g., volume ID, offset, length (as well as write data), to the persistence layer 330, which records the request in the persistent layer log 335 and returns an acknowledgement to the host 120 via the protocol layer 320. The persistence layer 330 may aggregate and organize write data 414 from one or more write requests into a new extent 470 and perform a hash computation, i.e., a hash function, on the new extent to generate a hash value 472 in accordance with an extent hashing technique 474.

The persistent layer 330 may then pass the write request with aggregated write data including, e.g., the volume ID, offset and length, as parameters 434 of a message to the appropriate volume layer instance. In an embodiment, message passing of the parameters 434 (received by the persistence later) may be redirected to another node via the function shipping mechanism, e.g., RPC, for inter-node communication. Alternatively, message passing of the parameters 434 may be via the IPC mechanism, e.g., message threads, for intra-node communication.

In one or more embodiments, a bucket mapping technique 476 is provided that translates the hash value 472 to an instance of an appropriate extent store layer (i.e., extent store instance 478) that is responsible for storing the new extent 470. Note that the bucket mapping technique may be implemented in any layer of the storage I/O stack above the extent store layer. In an embodiment, for example, the bucket mapping technique may be implemented in the persistence layer 330, the volume layer 340, or a layer the manages cluster-wide information, such as a cluster layer (not shown). Accordingly, the persistence layer 330, the volume layer 340, or the cluster layer may contain computer executable instructions executed by the CPU 210 to perform operations that implement the bucket mapping technique 476 described herein. The persistence layer 330 may then pass the hash value 472 and the new extent 470 to the appropriate volume layer instance and onto the appropriate extent store instance via an extent store put operation. The extent hashing technique 474 may embody an approximately uniform hash function to ensure that any random extent to be written may have an approximately equal chance of falling into any extent store instance 478, i.e., hash buckets are distributed across extent store instances of the cluster 100 based on available resources. As a result, the bucket mapping technique 476 provides load-balancing of write operations (and, by symmetry, read operations) across nodes 200 of the cluster, while also leveling flash wear in the SSDs 260 of the cluster.

In response to the put operation, the extent store instance may process the hash value 472 to perform an extent metadata selection technique 480 that (i) selects an appropriate hash table 482 (e.g., hash table 482*a*) from a set of hash tables (illustratively in-core) within the extent store instance 478, and (ii) extracts a hash table index 484 from the hash value 472 to index into the selected hash table and lookup a table entry having an extent key 618 identifying a storage location 490 on SSD 260 for the extent. Accordingly, the extent store layer 350 contains computer executable instructions executed by the CPU 210 to perform operations that implement the extent metadata selection technique 480 described herein. If a table entry with a matching extent key is found, then the SSD location 490 mapped from the extent key 618 is used to retrieve an existing extent (not shown) from SSD. The existing extent is then compared with the new extent 470 to determine whether their data is identical. If the data is identical, the new extent 470 is already stored on SSD 260 and a de-duplication opportunity (denoted de-duplication 452) exists such that there is no need to write another copy of the data. Accordingly, a reference count (not shown) in the table entry for the existing extent is incremented and the extent key 618 of the existing extent is passed to the appropriate volume layer instance for storage within an entry (denoted as volume metadata entry 600) of a dense tree metadata structure (e.g., dense tree 700*a*), such that the extent key 618 is associated an offset range 440 (e.g., offset range 440*a*) of the volume 445.

However, if the data of the existing extent is not identical to the data of the new extent 470, a collision occurs and a deterministic algorithm is invoked to sequentially generate as many new candidate extent keys (not shown) mapping to the same bucket as needed to either provide de-duplication 452 or produce an extent key that is not already stored within the extent store instance. Notably, another hash table (e.g. hash table 482*n*) may be selected by a new candidate extent key in accordance with the extent metadata selection technique 480. In the event that no de-duplication opportunity exists (i.e., the extent is not already stored) the new extent 470 is compressed in accordance with compression technique 454 and passed to the RAID layer 360, which processes the new extent 470 for storage on SSD 260 within one or more stripes 464 of RAID group 466. The extent store instance may cooperate with the RAID layer 360 to identify a storage segment 460 (i.e., a portion of the storage array 150) and a location on SSD 260 within the segment 460 in which to store the new extent 470. Illustratively, the identified storage segment is a segment with a large contiguous free space having, e.g., location 490 on SSD 260*b* for storing the extent 470.

In an embodiment, the RAID layer 360 then writes the stripes 464 across the RAID group 466, illustratively as one or more full write stripes 462. The RAID layer 360 may write a series of stripes 464 of sufficient depth to reduce data relocation that may occur within the flash-based SSDs 260 (i.e., flash block management). The extent store instance then (i) loads the SSD location 490 of the new extent 470 into the selected hash table 482*n* (i.e., as selected by the new candidate extent key), (ii) passes a new extent key (denoted as extent key 618) to the appropriate volume layer instance for storage within an entry (also denoted as volume metadata entry 600) of a dense tree 700 managed by that volume layer instance, and (iii) records a change to extent metadata of the selected hash table in the extent store layer log 355. Illustratively, the volume layer instance selects dense tree 700*a* spanning an offset range 440*a* of the volume 445 that encompasses the offset range of the write request. As noted, the volume 445 (e.g., an offset space of the volume) is partitioned into multiple regions (e.g., allotted as disjoint offset ranges); in an embodiment, each region is represented by a dense tree 700. The volume layer instance then inserts the volume metadata entry 600 into the dense tree 700*a* and records a change corresponding to the volume metadata entry in the volume layer log 345. Accordingly, the I/O (write) request is sufficiently stored on SSD 260 of the cluster.

Read Path

Figure 5:
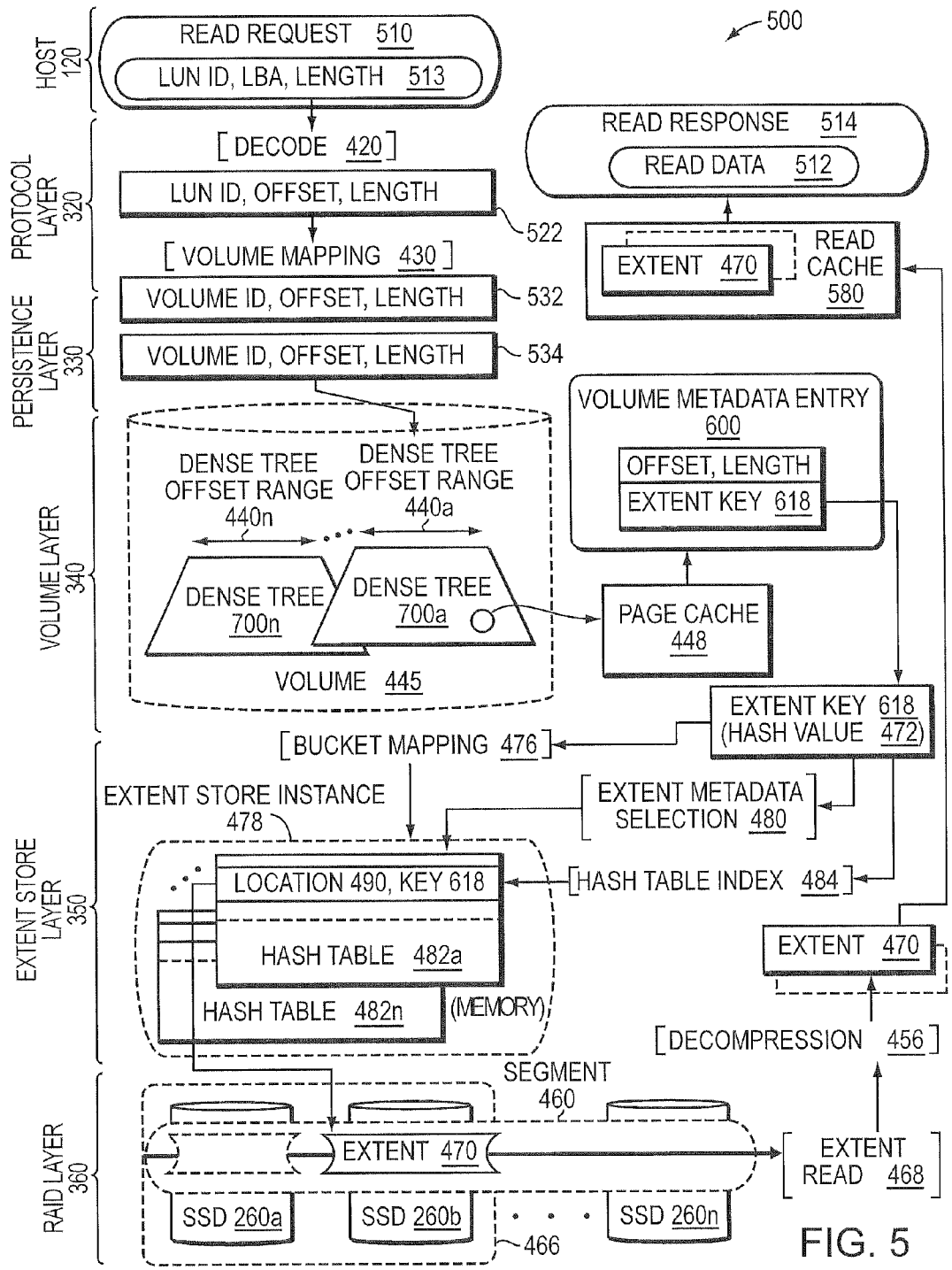
FIG. 5 illustrates a read path of the storage I/O stack.

FIG. 5 illustrates an I/O (e.g., read) path 500 of the storage I/O stack 300 for processing an I/O request, e.g., a SCSI read request 510. The read request 510 may be issued by host 120 and received at the protocol layer 320 of a node 200 in the cluster 100. Illustratively, the protocol layer 320 processes the read request by decoding 420 (e.g., parsing and extracting) fields of the request, e.g., LUN ID, LBA, and length (shown at 513), and uses the results 522, e.g., LUN ID, offset, and length, for the volume mapping technique 430. That is, the protocol layer 320 may implement the volume mapping technique 430 (described above) to translate the LUN ID and LBA range (i.e., equivalent offset and length) of the read request to an appropriate volume layer instance, i.e., volume ID (volume 445), in the cluster 100 that is responsible for managing volume metadata for the LBA (i.e., offset) range. The protocol layer then passes the results 532 to the persistence layer 330, which may search the write cache 380 to determine whether some or all of the read request can be serviced from its cached data. If the entire request cannot be serviced from the cached data, the persistence layer 330 may then pass the remaining portion of the request including, e.g., the volume ID, offset and length, as parameters 534 to the appropriate volume layer instance in accordance with the function shipping mechanism (e.g., RPC, for inter-node communication) or the IPC mechanism (e.g., message threads, for intra-node communication).

The volume layer instance may process the read request to access a dense tree metadata structure (e.g., dense tree 700*a*) associated with a region (e.g., offset range 440*a*) of a volume 445 that encompasses the requested offset range (specified by parameters 534). The volume layer instance may further process the read request to search for (lookup) one or more volume metadata entries 600 of the dense tree 700*a* to obtain one or more extent keys 618 associated with one or more extents 470 within the requested offset range. As described further herein, each dense tree 700 may be embodied as multiple levels of a search structure with possibly overlapping offset range entries at each level. The entries, i.e., volume metadata entries 600, provide mappings from host-accessible LUN addresses, i.e., LBAs, to durable extent keys. The various levels of the dense tree may have volume metadata entries 600 for the same offset, in which case the higher level has the newer entry and is used to service the read request. A top level of the dense tree 700 is illustratively resident in-core and a page cache 448 may be used to access lower levels of the tree. If the requested range or portion thereof is not present in the top level, a metadata page associated with an index entry at the next lower tree level is accessed. The metadata page (i.e., in the page cache 448) at the next level is then searched (e.g., a binary search) to find any overlapping entries. This process is then iterated until one or more volume metadata entries 600 of a level are found to ensure that the extent key(s) 618 for the entire requested read range are found. If no metadata entries exist for the entire or portions of the requested read range, then the missing portion(s) are zero filled.

Once found, each extent key 618 is processed by the volume layer 340 to, e.g., implement the bucket mapping technique 476 that translates the extent key to an appropriate extent store instance 478 responsible for storing the requested extent 470. Note that, in an embodiment, each extent key 618 is substantially identical to hash value 472 associated with the extent 470, i.e., the hash value as calculated during the write request for the extent, such that the bucket mapping 476 and extent metadata selection 480 techniques may be used for both write and read path operations. Note also that the extent key 618 may be derived from the hash value 472. The volume layer 340 may then pass the extent key 618 (i.e., the hash value 472 from a previous write request for the extent) to the appropriate extent store instance 478 (via an extent store get operation), which performs an extent key-to-SSD mapping to determine the location on SSD 260 for the extent.

In response to the get operation, the extent store instance may process the extent key 618 (i.e., hash value 472) to perform the extent metadata selection technique 480 that (i) selects an appropriate hash table (e.g., hash table 482a) from a set of hash tables within the extent store instance 478, and (ii) extracts a hash table index 484 from the extent key 618 (i.e., hash value 472) to index into the selected hash table and lookup a table entry having a matching extent key 618 that identifies a storage location 490 on SSD 260 for the extent 470. That is, the SSD location 490 mapped to the extent key 618 may be used to retrieve the existing extent (denoted as extent 470) from SSD 260 (e.g., SSD 260b). The extent store instance then cooperates with the RAID layer 360 to access the extent on SSD 260b and retrieve the data contents in accordance with the read request. Illustratively, the RAID layer 360 may read the extent in accordance with an extent read operation 468 and pass the extent 470 to the extent store instance. The extent store instance may then decompress the extent 470 in accordance with a decompression technique 456, although it will be understood to those skilled in the art that decompression can be performed at any layer of the storage I/O stack 300. The extent 470 may be stored in a buffer (not shown) in memory 220 and a reference to that buffer may be passed back through the layers of the storage I/O stack. The persistence layer may then load the extent into a read cache 580 (or other staging mechanism) and may extract appropriate read data 512 from the read cache 580 for the LBA range of the read request 510. Thereafter, the protocol layer 320 may create a SCSI read response 514, including the read data 512, and return the read response to the host 120.

Dense Tree Volume Metadata

As noted, a host-accessible LUN may be apportioned into multiple volumes, each of which may be partitioned into one or more regions, wherein each region is associated with a disjoint offset range, i.e., a LBA range, owned by an instance of the volume layer 340 executing on a node 200. For example, assuming a maximum volume size of 64 terabytes (TB) and a region size of 16 gigabytes (GB), a volume may have up to 4096 regions (i.e., 16 GB×4096=64 TB). In an embodiment, region 1 may be associated with an offset range of, e.g., 0-16 GB, region 2 may be associated with an offset range of 16 GB-32 GB, and so forth. Ownership of a region denotes that the volume layer instance manages metadata, i.e., volume metadata, for the region, such that I/O requests destined to an offset range within the region are directed to the owning volume layer instance. Thus, each volume layer instance manages volume metadata for, and handles I/O requests to, one or more regions. A basis for metadata scale-out in the distributed storage architecture of the cluster 100 includes partitioning of a volume into regions and distributing of region ownership across volume layer instances of the cluster.

Volume metadata, as well as data storage, in the distributed storage architecture is illustratively extent based. The volume metadata of a region that is managed by the volume layer instance is illustratively embodied as in memory (in-core) and on SSD (on-flash) volume metadata configured to provide mappings from host-accessible LUN addresses, i.e., LBAs, of the region to durable extent keys. In other words, the volume metadata maps LBA (i.e., offset) ranges of the LUN to data of the LUN (via extent keys) within the respective LBA range. In an embodiment, the volume layer organizes the volume metadata (embodied as volume metadata entries 600) as a data structure, i.e., a dense tree metadata structure (dense tree 700), which maps an offset range within the region to one or more extent keys. That is, LUN data (user data) stored as extents (accessible via extent keys) is associated with LUN offset (i.e., LBA) ranges represented as volume metadata (also stored as extents). Accordingly, the volume layer 340 contains computer executable instructions executed by the CPU 210 to perform operations that organize and manage the volume metadata entries of the dense tree metadata structure described herein.

Figure 6:
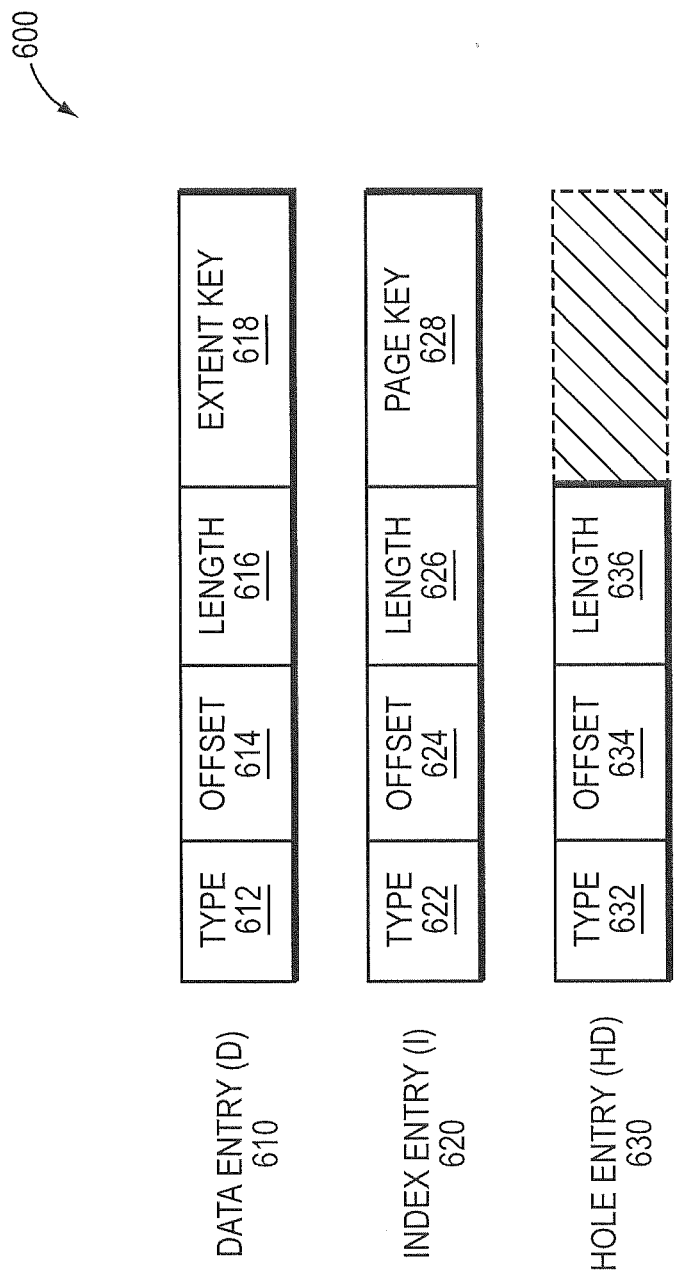
FIG. 6 is a block diagram of various volume metadata entries.

FIG. 6 is a block diagram of various volume metadata entries 600 of the dense tree metadata structure. Each volume metadata entry 600 of the dense tree 700 may be a descriptor that embodies one of a plurality of types, including a data entry (D) 610, an index entry (I) 620, and a hole entry (H) 630. The data entry (D) 610 is configured to map (offset, length) to an extent key for an extent (user data) and includes the following content: type 612, offset 614, length 616 and extent key 618. The index entry (I) 620 is configured to map (offset, length) to a page key (e.g., an extent key) of a metadata page (stored as an extent), i.e., a page containing one or more volume metadata entries, at a next lower level of the dense tree; accordingly, the index entry 620 includes the following content: type 622, offset 624, length 626 and page key 628. Illustratively, the index entry 620 manifests as a pointer from a higher level to a lower level, i.e., the index entry 620 essentially serves as linkage between the different levels of the dense tree. The hole entry (H) 630 represents absent data as a result of a hole punching operation at (offset, length) and includes the following content: type 632, offset 634, and length 636.

In an embodiment, the volume metadata entry types are of a fixed size (e.g., 12 bytes including a type field of 1 byte, an offset of 4 bytes, a length of 1 byte, and a key of 6 bytes) to facilitate search of the dense tree metadata structure as well as storage on metadata pages. Thus, some types may have unused portions, e.g., the hole entry 630 includes less information than the data entry 610 and so may have one or more unused bytes. In an alternative embodiment, the entries may be variable in size to avoid unused bytes. Advantageously, the volume metadata entries may be sized for in-core space efficiency (as well as alignment on metadata pages), which improves both read and write amplification for operations. For example, the length field (616, 626, 636) of the various volume metadata entry types may represent a unit of sector size, such as 512 bytes or 520 bytes, such that a 1 byte length may represent a range of 255×512 bytes=128 K bytes.

Figure 7:
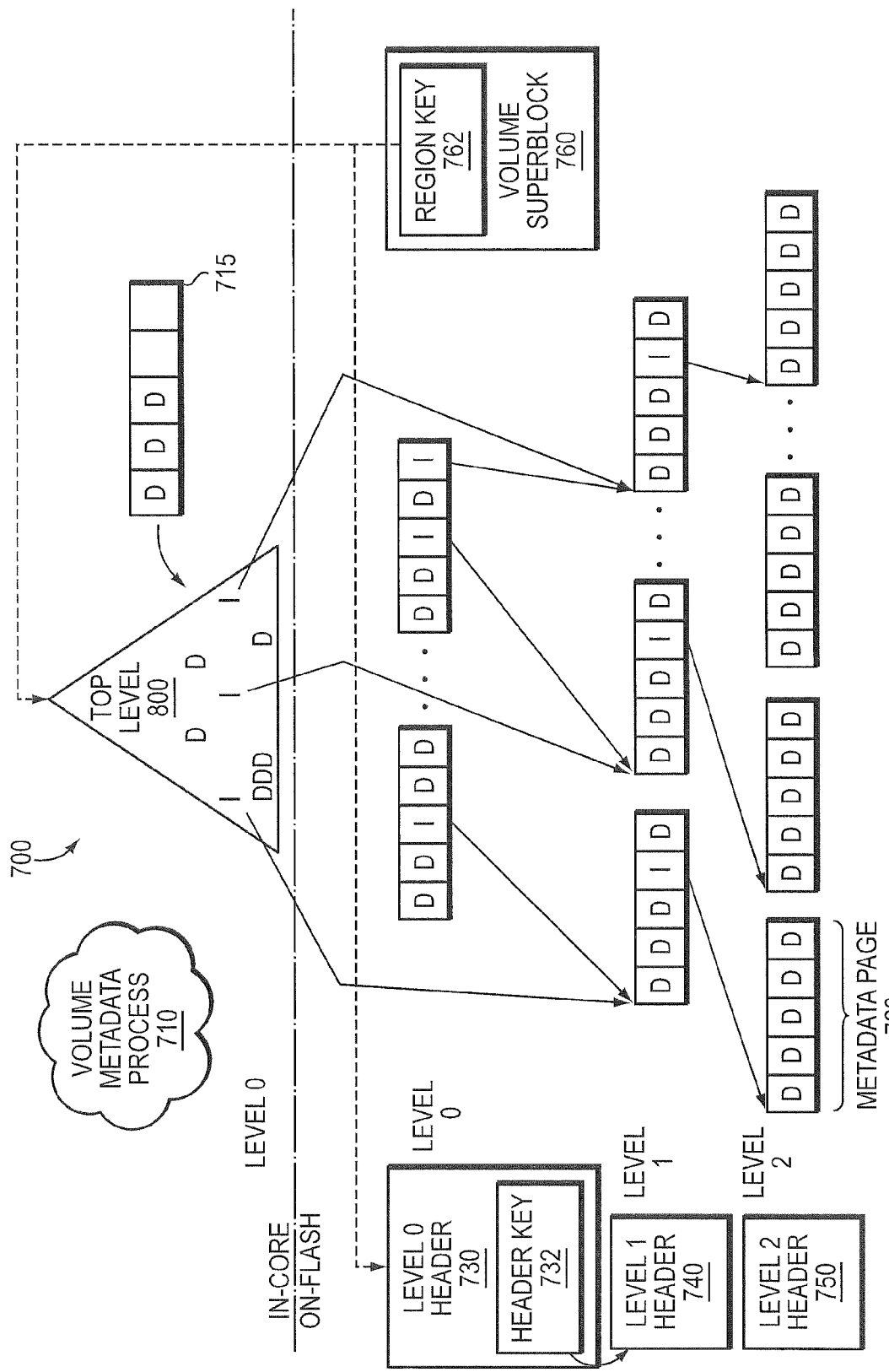
FIG. 7 is a block diagram of a dense tree metadata structure.

FIG. 7 is a block diagram of the dense tree metadata structure that may be advantageously used with one or more embodiments described herein. The dense tree metadata structure 700 is configured to provide mappings of logical offsets within a LUN (or volume) to extent keys managed by one or more extent store instances. Illustratively, the dense tree metadata structure is organized as a multi-level dense tree 700, where a top level 800 represents recent volume metadata changes and subsequent descending levels represent older changes. Specifically, a higher level of the dense tree 700 is updated first and, when that level fills, an adjacent lower level is updated, e.g., via a merge operation. A latest version of the changes may be searched starting at the top level of the dense tree and working down to the descending levels. Each level of the dense tree 700 includes fixed size records or entries, i.e., volume metadata entries 600, for storing the volume metadata. A volume metadata process 710 illustratively maintains the top level 800 of the dense tree in memory (in-core) as a balanced tree that enables indexing by offsets. The volume metadata process 710 also maintains a fixed sized (e.g., 4 KB) in-core buffer as a staging area (i.e., an in-core staging buffer 715) for volume metadata entries 600 inserted into the balanced tree (i.e., top level 800). Each level of the dense tree is further maintained on-flash as a packed array of volume metadata entries, wherein the entries are stored as extents illustratively organized as fixed sized (e.g., 4 KB) metadata pages 720. Notably, the staging buffer 715 is de-staged to SSD upon a trigger, e.g. the staging buffer is full. Each metadata page 720 has a unique identifier (ID), which guarantees that no two metadata pages can have the same content. Illustratively, metadata may not be de-duplicated by the extent store layer 350.

In an embodiment, the multi-level dense tree 700 includes three (3) levels, although it will be apparent to those skilled in the art that additional levels N of the dense tree may be included depending on parameters (e.g., size) of the dense tree configuration. Illustratively, the top level 800 of the tree is maintained in-core as level 0 and the lower levels are maintained on-flash as levels 1 and 2. In addition, copies of the volume metadata entries 600 stored in staging buffer 715 may also be maintained on-flash as, e.g., a level 0 linked list. A leaf level, e.g., level 2, of the dense tree contains data entries 610, whereas a non-leaf level, e.g., level 0 or 1, may contain both data entries 610 and index entries 620. Each index entry (I) 620 at level N of the tree is configured to point to (reference) a metadata page 720 at level N+1 of the tree. Each level of the dense tree 600 also includes a header (e.g., level 0 header 730, level 1 header 740 and level 2 header 750) that contains per level information, such as reference counts associated with the extents. Each upper level header contains a header key (an extent key for the header, e.g., header key 732 of level 0 header 730) to a corresponding lower level header. A region key 762 to a root, e.g., level 0 header 730 (and top level 800), of the dense tree 700 is illustratively stored on-flash and maintained in a volume root extent, e.g., a volume superblock 760. Notably, the volume superblock 760 contains region keys to the roots of the dense tree metadata structures for all regions in a volume.

Figure 8:
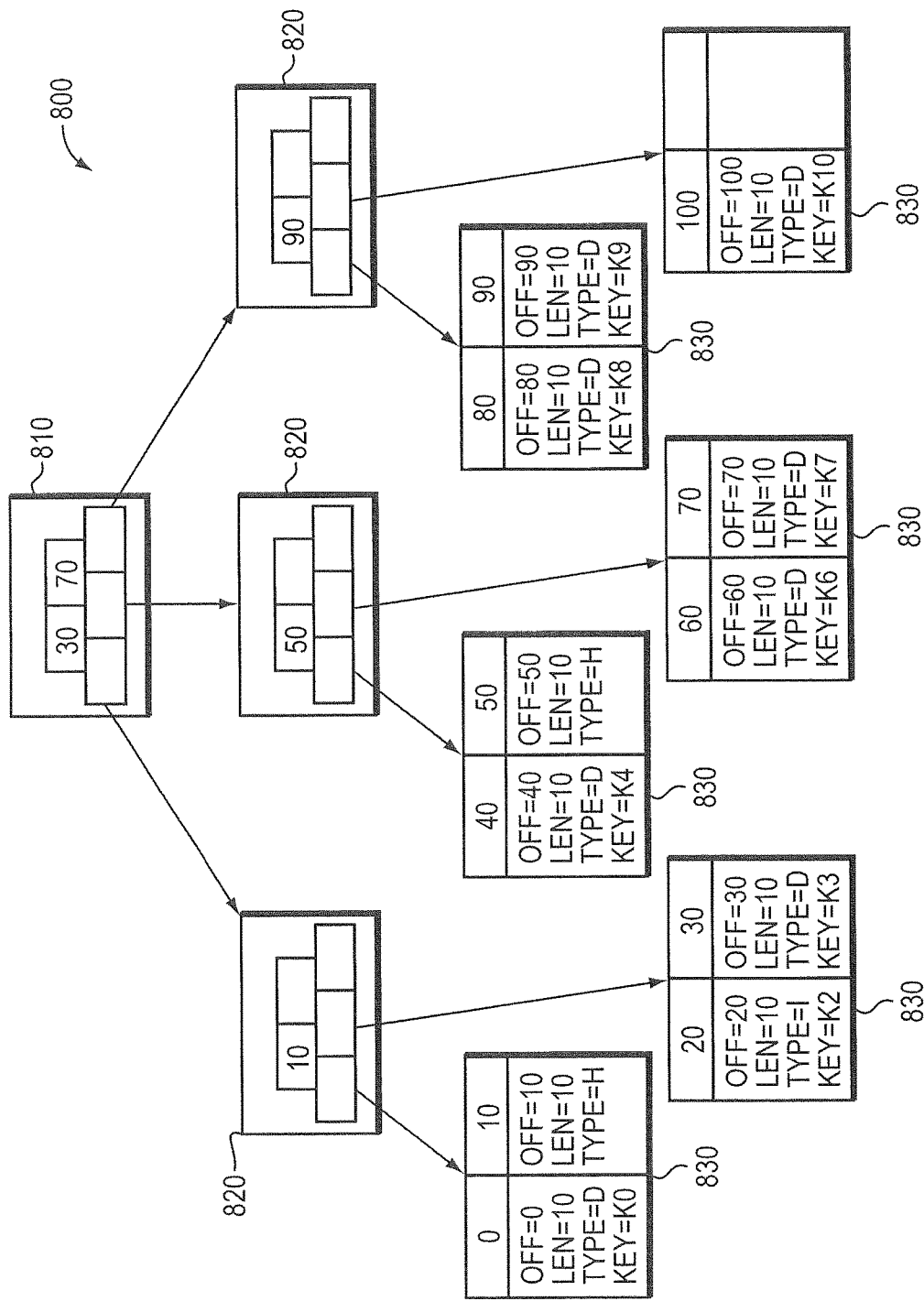
FIG. 8 is a block diagram of a top level of the dense tree metadata structure.

FIG. 8 is a block diagram of the top level 800 of the dense tree metadata structure. As noted, the top level (level 0) of the dense tree 700 is maintained in-core as a balanced tree, which is illustratively embodied as a B+ tree data structure. However, it will be apparent to those skilled in the art that other data structures, such as AVL trees, Red-Black trees, and heaps (partially sorted trees), may be advantageously used with the embodiments described herein. The B+ tree (top level 800) includes a root node 810, one or more internal nodes 820 and a plurality of leaf nodes (leaves) 830. The volume metadata stored on the tree is preferably organized in a manner that is efficient both to search, in order to service read requests, and to traverse (walk) in ascending order of offset to accomplish merges to lower levels of the tree. The B+ tree has certain properties that satisfy these requirements, including storage of all data (i.e., volume metadata entries 600) in leaves 830 and storage of the leaves as sequentially accessible, e.g., as one or more linked lists. Both of these properties make sequential read requests for write data (i.e., extents) and read operations for dense tree merge efficient. Also, since it has a much higher fan-out than a binary search tree, the illustrative B+ tree results in more efficient lookup operations. As an optimization, the leaves 830 of the B+ tree may be stored in a page cache 448, making access of data more efficient than other trees. In addition, resolution of overlapping offset entries in the B+ tree optimizes read requests of extents. Accordingly, the larger the fraction of the B+ tree (i.e., volume metadata) maintained in-core, the less loading (reading) of metadata from SSD is required so as to reduce read amplification.

Figure 9:
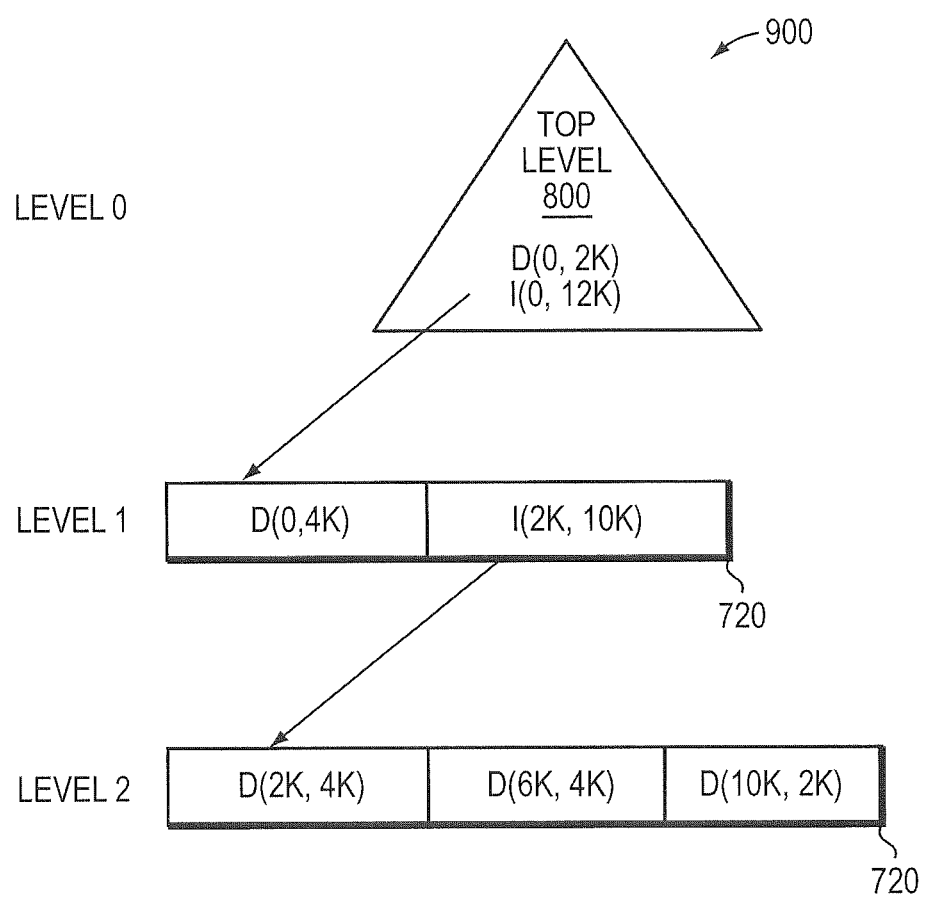
FIG. 9 illustrates mapping between levels of the dense tree metadata structure.

FIG. 9 illustrates mappings 900 between levels of the dense tree metadata structure. Each level of the dense tree 700 includes one or more metadata pages 720, each of which contains multiple volume metadata entries 600. As noted, each volume metadata entry 600 has a fixed size, e.g., 12 bytes, such that a predetermined number of entries may be packed into each metadata page 720. The data entry (D) 610 is a map of (offset, length) to an address of (user) data which is retrievable using an extent key 618 (i.e., from an extent store instance). The (offset, length) illustratively specifies an offset range of a LUN. The index entry (I) 620 is a map of (offset, length) to a page key 628 of a metadata page 720 at the next lower level. Illustratively, the offset in the index entry (I) 620 is the same as the offset of the first entry in the metadata page 720 at the next lower level. The length 626 in the index entry 620 is illustratively the cumulative length of all entries in the metadata page 720 at the next lower level (including gaps between entries).

For example, the metadata page 720 of level 1 includes an index entry "I(2K,10K)" that specifies a starting offset 2K and an ending offset 12K (i.e., 12K=2K+10K); the index entry (I) illustratively points to a metadata page 720 of level 2 covering the specified range. An aggregate view of the data entries (D) packed in the metadata page 720 of level 2 covers the mapping from the smallest offset (e.g., 2K) to the largest offset (e.g., 12K). Thus, each level of the dense tree 700 may be viewed as an overlay of an underlying level. For instance the data entry "D(0,4K)" of level 1 overlaps 2K of the underlying metadata in the page of level 2 (i.e., the range 2K to 4K).

Figure 10:
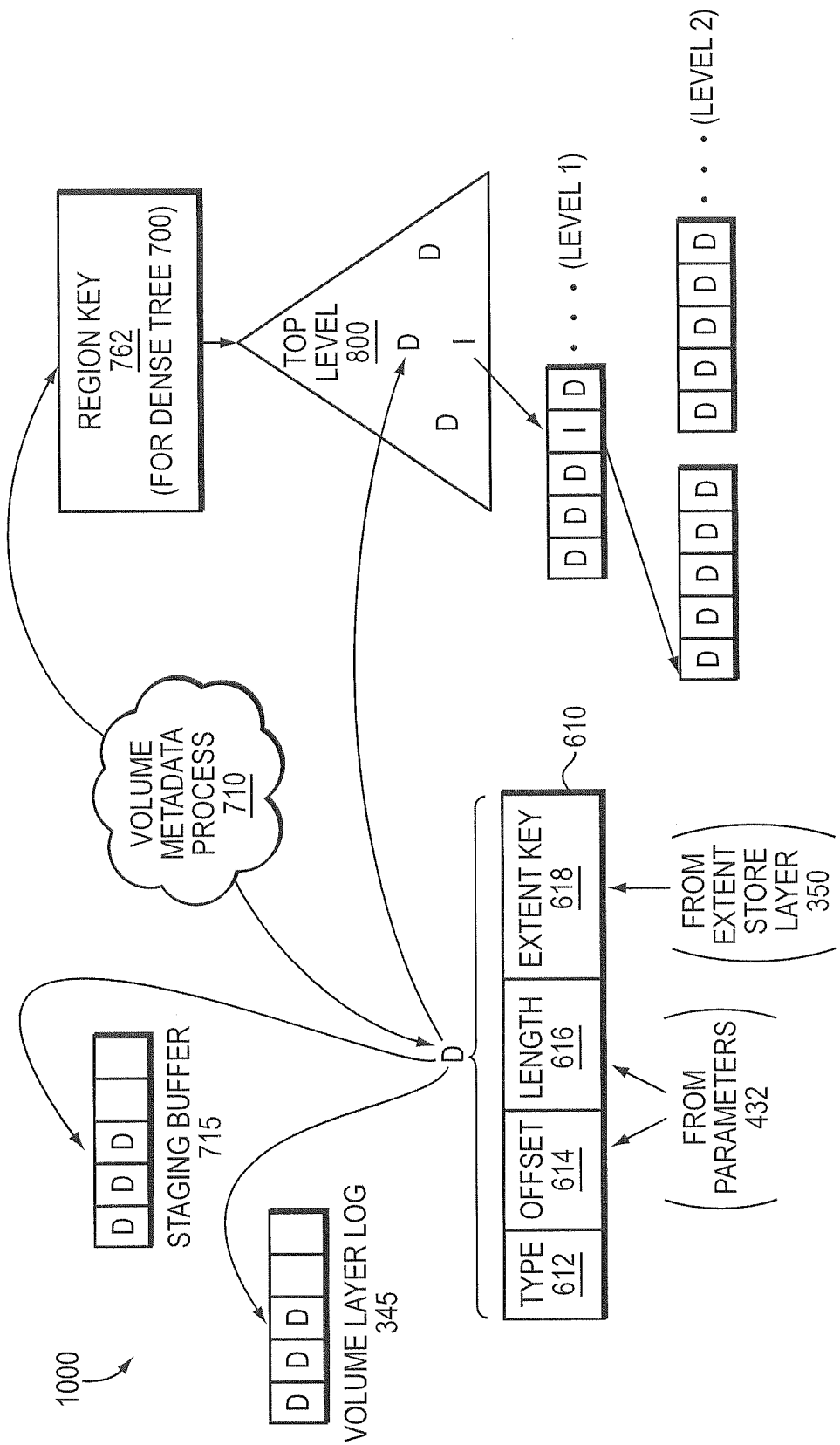
FIG. 10 illustrates a workflow for inserting a volume metadata entry into the dense tree metadata structure in accordance with a write request.

In one or more embodiments, operations for volume metadata managed by the volume layer 340 include insertion of volume metadata entries, such as data entries 610, into the dense tree 700 for write requests. As noted, each dense tree 700 may be embodied as multiple levels of a search structure with possibly overlapping offset range entries at each level, wherein each level is a packed array of entries (e.g., sorted by offset) and where leaf entries have an offset range (offset, length) and an extent key. FIG. 10 illustrates a workflow 1000 for inserting a volume metadata entry into the dense tree metadata structure in accordance with a write request. In an embodiment, volume metadata updates (changes) to the dense tree 700 occur first at the top level of the tree, such that a complete, top-level description of the changes is maintained in memory 220. Operationally, the volume metadata process 710 applies the region key 762 to access the dense tree 700 (i.e., top level 800) of an appropriate region (e.g., offset range 440 as determined from the parameters 432 derived from a write request 410). Upon completion of the write request, the volume metadata process 710 creates a volume metadata entry, e.g., a new data entry 610, to record a mapping of offset/length-to-extent key (i.e., offset rangeto-user data). Illustratively, the new data entry 610 includes an extent key 618 (i.e., from the extent store layer 350) associated with data (i.e., extent 470) of the write request 410, as well as offset 614 and length 616 (i.e., from the write parameters 432) and type 612 (i.e., data entry D). The volume metadata process 710 then updates the volume metadata by inserting (adding) the data entry D into the level 0 staging buffer 715, as well as into the top level 800 of dense tree 700 and the volume layer log 345, thereby signifying that the write request is stored on SSD 260 of the cluster.

Figure 11:
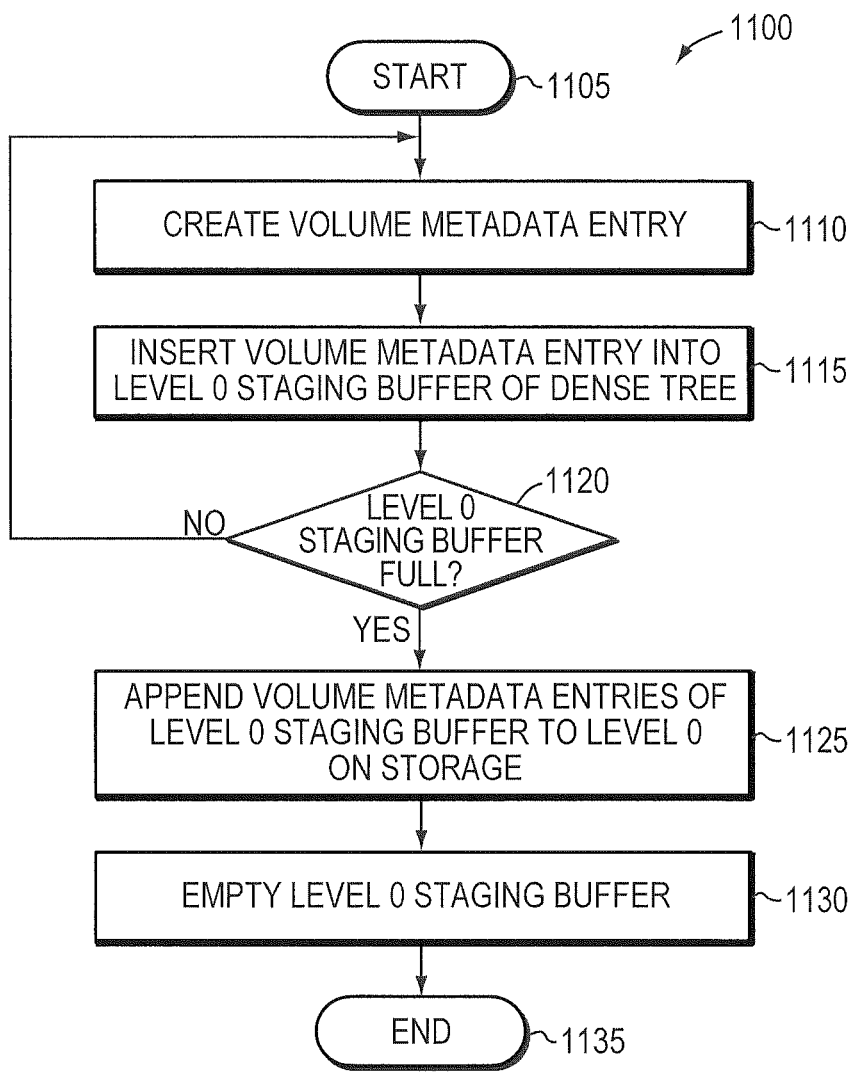
FIG. 11 is an example simplified procedure for inserting a volume metadata entry into the dense tree metadata structure in accordance with the write request.

FIG. 11 is an example simplified procedure 1100 for inserting a volume metadata entry into the dense tree metadata structure in accordance with a write request. The procedure starts at step 1105 and proceeds to step 1110 where, at the completion of the write request, the volume metadata process creates a volume metadata entry, e.g., a new data entry, to record a mapping of offset/length-to-extent key. At step 1115, the volume metadata process inserts (adds) the volume metadata entry into level 0 of the dense tree, i.e., into the level 0 staging buffer. Illustratively, the entry is also added to the top level of the dense tree as a leaf node and to the volume layer log. At step 1120, a determination is made as to whether the level 0 staging buffer is full. If not, the procedure returns to step 1110; otherwise, if the buffer is full, the volume metadata entries stored in the level 0 staging buffer are appended to level 0 of the dense tree on SSD at step 1125 (i.e., de-staged and stored on SSD). At step 1130, the level 0 staging buffer is emptied to allow space for new volume metadata entries. The procedure then ends at step 1135.

In an embodiment, the staging buffer 715 is sized to determine the frequency of append operations, i.e., step 1125 of procedure 1100. For example, an 8 KB staging buffer with volume metadata entries of 12 bytes in size is appended after 8192/12≈682 operations. It should be noted that previously described merge operations are distinct from the append procedure described immediately above in FIG. 11. Merge operations illustratively occur between a higher level in the dense tree and a lower level in the dense tree (e.g., level 0 in-core to level 1 on SSD and level 1 on SSD to level 2 on SSD) using a merge sort operation. On the other hand, append operations occur ostensibly from the in-core level 0 (i.e., the staging buffer) to level 0 on SSD using an append operation.

Figure 12:
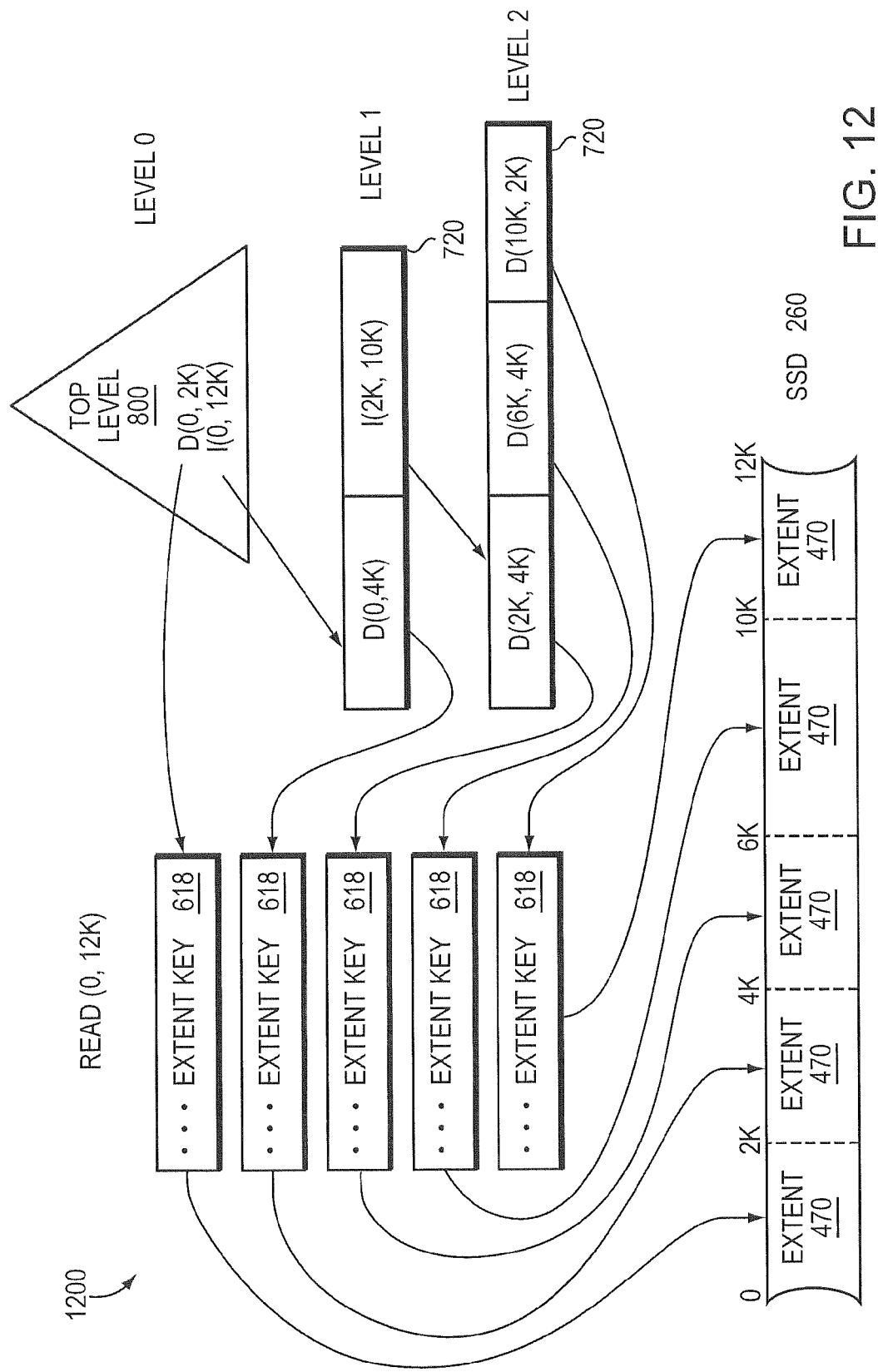
FIG. 12 illustrates a workflow for searching the dense tree metadata structure for one or more volume metadata entries in accordance with a read request.

Operations for volume metadata managed by the volume layer 340 also include lookup (search) of the dense tree 700 for volume metadata entries, such as data entries 610, for read requests. FIG. 12 illustrates a workflow 1200 for searching the dense tree metadata structure for one or more volume metadata entries in accordance with a read request. For the read request, level 0 (i.e., the top level 800 and/or the level 0 staging buffer 715) is first searched for overlapping entries (such as data entries D and index entries I), and one or more metadata pages 720 associated with index entries I at one or more next levels (i.e., level 1 and/or level 2) may be read (e.g., loaded in-core). A binary search is then performed on each metadata page 720 to find any overlapping entries.

For example, assume a read request is directed to a portion of data ranging from 0-12K, i.e., Read 0,12K (offset, length). The volume layer 340 (e.g., volume metadata process 710) processes the read request to initiate a search at level 0 (e.g., top level 800) where a data entry D is found that covers a portion (0-2K) of the requested data. Thus, the data entry D related to the 0-2K portion (range) of the requested data is read from level 0 to obtain an extent key 618 associated with an extent 470 storing the 0-2K portion of the data on SSD 260. An index entry "I(0,12K)" of top level 800 indicates that the additional requested data for the range is located at one or more lower levels of the tree. Accordingly, a level 1 metadata page 720 corresponding to "I(0K-12K)" is searched (e.g., a binary search) and another data entry D is found that covers portion (0-4K) of the requested data. Here, the data entry D related to the 0-4K portion of the data is read from level 1 to obtain an extent key 618 associated with an extent 470 storing a 2K-4K portion (range) of the data on SSD. Note that the 0-2K portion of the data read from the extent 470 referenced by level 0 is more recent than the corresponding portion of data referenced by level 1 (i.e., newer data in the upper level range overlays older data in a lower level range); accordingly, only the 2K-4K portion (range) of the data is used from the extent referenced by level 1 to form the response to the read request.

Another index entry "I(2K,10K)" (i.e., offset, length) in the level 1 page indicates that further additional requested data for the range is located at a next lower level (level 2). A level 2 metadata page 720 corresponding (mapping) to "I(2K, 10K)" is then searched to discover three data entries D that cover the remaining portions (2K, 4K), (6K, 4K) and (10K, 2K) of the requested data. Illustratively, the data entry D(2K, 4K) related to the 2K-6K portion (range) of the data is read from level 2 to obtain the extent key 618 associated with an extent 470 storing a 4K-6K portion of the data on SSD 260. Here again, the 2K-4K portion (range) of the data read from the extent 470 referenced by level 1 is more recent than the corresponding portion of data referenced by level 2; accordingly, only the 4K-6K portion (range) of the data is read from the extent referenced by level 2. Lastly, the data entries D(6K, 4K) and D(10K, 2K) related to the 6K-10K and 10K-12K portions (ranges) of the data are read to obtain extent keys 618 associated with the extents 470 storing those portions of the data on SSD 260 to complete the read request. Notably, the volume layer 350 may also use the page cache 448 to access the lower levels of the dense tree stored on SSD.

In an embodiment, different levels of the dense tree 700 may have volume metadata entries 600 for the same offset, in which case, the higher level has the newer entry and is used to serve the read request. In other words, higher levels (e.g., level 0) of the dense tree 700 contain recent metadata mappings and, as such, are searched first to satisfy the read request. For instance, if the read request was directed to 0-2K (range), the data may be found completely at D(0, 2K) from the top level 800 (or level 0 buffer 715). Older entries are located at the lower levels (e.g., level 2) of the dense tree because the tree grows from the top down. Moreover, if the read access may be resolved at levels 0 and 1, there is no need to access level 2. That is, if the read request was directed to 0-4K, the first 2K may be found at level 0 and the second 2K (2K-4K) may be found at level 1, and the request may be completely satisfied without searching level 2. Accordingly, the organization of the dense tree data structure, i.e., where the top level 800 represents recent volume metadata changes and subsequent descending levels 1-2 represent older changes, decreases search operations to storage array 150 (SSD 260), thereby reducing both write and read amplification.

For example, if a dense tree spans an offset range of 16 GB with an average extent size of 4 KB, approximately 4 million entries (16 GB/4 KB=4,194,304) are required in the leaves of the dense tree (e.g., stored at level 2 on SSD). Further, if the multiplication ratio between adjacent levels of the dense tree is 8, then level 1 has approximately 500K entries (4,192,304/8=524,288) and level 0 has 64K (exactly, 524,288/8) entries. Thus when level 0 is filled in-core, 524,288 entries may be written (i.e., overwritten) in level 1 to SSD. If each entry is assumed to occupy 12 bytes (i.e., size of the metadata entry 600), the write amplification would be 500K entries (level 1)×12 bytes (number of bytes per entry)/64K (number of entries to fill level 0, i.e., one per user request)=96 bytes per 4 KB extent written. Further, the same write amplification occurs between level 1 and level 2: 4M entries (level 2)×12 bytes per entry/500K (number of entries on level 1)=96 bytes. Thus a total of 96+96=192 bytes of metadata are written per 4 KB extent written or approximately 4.7% metadata overhead, i.e. a write amplification of approximately 1.023 for volume offset/range metadata.

Figure 13:
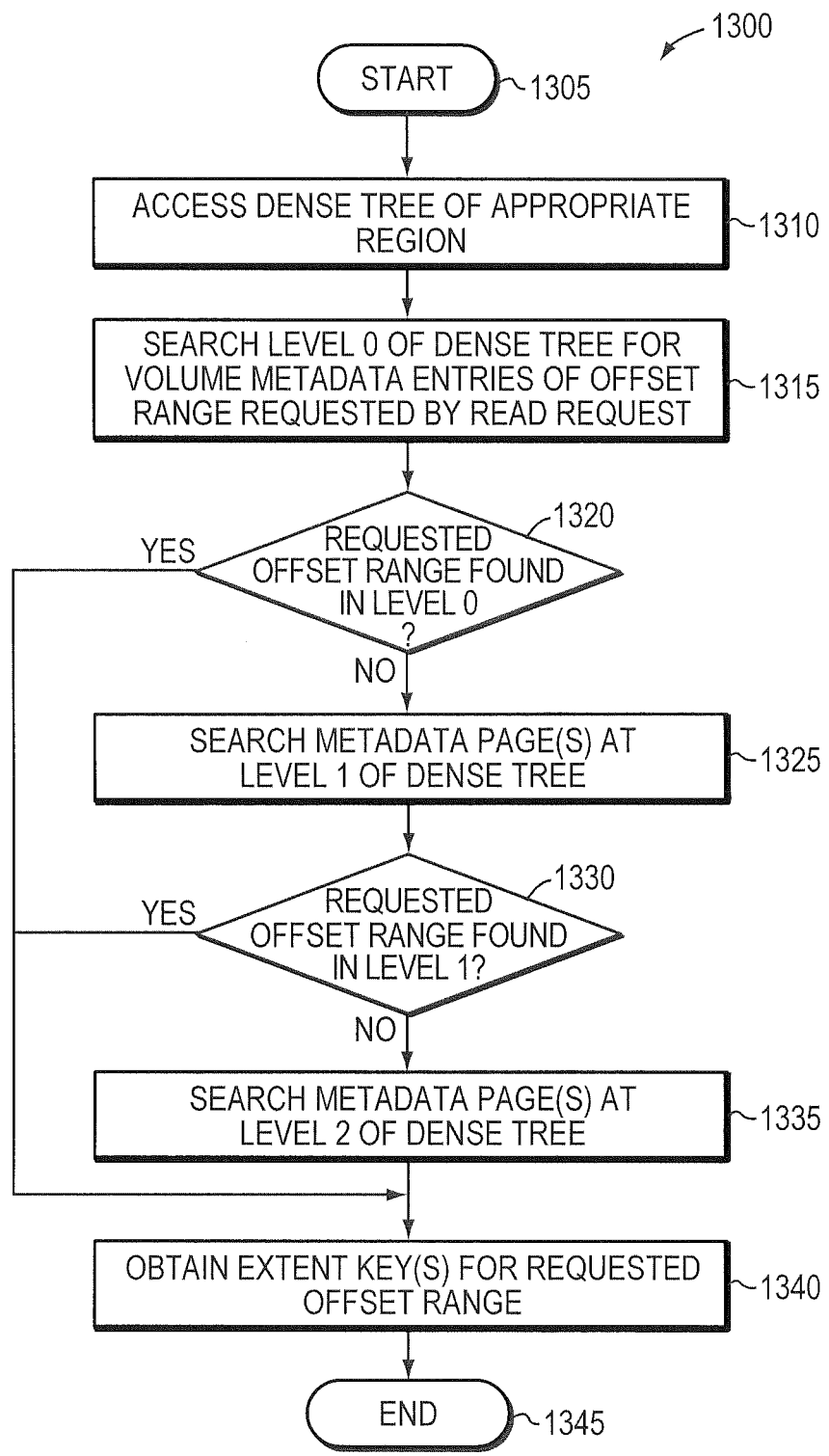
FIG. 13 is an example simplified procedure for searching the dense tree metadata structure for one or more volume metadata entries in accordance with the read request.

FIG. 13 is an example simplified procedure 1300 for searching the dense tree metadata structure for one or more volume metadata entries in accordance with a read request. The procedure starts at step 1305 and proceeds to step 1310 where, during the read request, the volume metadata process accesses the dense tree of the appropriate region to search for (lookup) volume metadata needed to locate the extent key(s) related to the range of the read request. As noted, determination of which region (i.e., offset range) to search is based on the particular offset in the read request. At step 1315, the volume metadata process searches level 0 (top level and/or staging buffer) of the dense tree for overlapping volume metadata entries, e.g., data entries and index entries, of the offset range requested by the read request. At step 1320, a determination is made as to whether the requested offset range is found in level 0. If so, the extent key(s) for the entire requested range is obtained at step 1340 and the procedure ends at Step 1345. If the requested offset range is not found in level 0, then the metadata page(s) associated with the index entry(s) at level 1 is searched (e.g., a binary search or search based on the dense tree data structure, such as a heap search) for one or more overlapping entries (step 1325). Notably the read request may straddle a plurality of extents, unless a metadata entry in the dense tree (i.e., associated with one extent) precisely matches the requested offset range. In addition, metadata pages of lower levels on SSD may be cached in page cache and loaded on demand. At step 1330, a determination is made as to whether the requested offset range is found in level 1. If so, the extent key(s) for the entire requested range is obtained at step 1340 and the procedure ends at step 1345. If the requested offset range is not found in level 1, then the metadata page(s) associated with the index entry(s) at level 2 is searched (a binary search) to find one or more overlapping entries (step 1335). At step 1340, the extent key(s) for the entire requested offset range is obtained and, at step 1345, the procedure ends.

While there have been shown and described illustrative embodiments directed to an organization of metadata managed by a volume layer of a storage I/O stack executing on one or more nodes of a cluster, it is to be understood that various other adaptations and modifications may be made within the spirit and scope of the embodiments herein. For example, embodiments have been shown and described herein with relation to operations for volume metadata including the insertion of volume metadata entries, such as data entries, into the dense tree for write requests and lookup of data entries in the dense tree for read requests. However, the embodiments in their broader sense are not so limited, and may, in fact, allow for deletions of volume metadata entries, such as data entries, for hole punch requests.

In an embodiment, deletions in the dense tree 700 may occur as a result of hole punching (unmap) operations and/or overwrite operation. Hole punching operations are illustratively represented by the hole entries (H) 630, whereas overwrite operations are represented as regular data entries (D) 610 that have overlapping offsets with previous data entries (i.e., newer entries in higher levels of the dense tree overlay older lower level entries). Overlapping volume metadata entries 600 on different levels of the dense tree 700 may be resolved during merge time (i.e., during a merge operation). New and old volume metadata entries from different levels may be sorted by offsets. Lower level data entries 610 whose offset ranges are covered by the newer hole entries 630 or newer data entries 610 (via overwrite operations) may be identified and deleted at that time. Extent store deletions of extents 470 may be performed in a delayed fashion (e.g., during a volume metadata merge operation) or synchronously (e.g., during a volume layer overwrite or hole punch operation). In the case of delayed deletions (free operations), the extent keys 618 for the extents to be deleted may be identified at the time when the data entries 610 are deleted. To synchronously delete (free), lower level data entries whose offset ranges are covered by the newer hole entries or newer data entries (via overwrites) may be searched as part of hole punching or overwrite operation, i.e., the underlying overwritten or hole-punched extent may be deleted at that time. Delayed deletions (frees) are generally more efficient (performed at merge time) and thus may be used as the default mode of operation. A separate dedicated delete log (not shown) may be used to record extent deletion requests made to the appropriate extent store layer instance for overwritten or deleted (i.e., hole punched) extents.

Advantageously, the dense tree metadata structure described herein is optimized for high performance and is compact so as to enable recent volume metadata to reside in memory. That is, the dense tree is organized such that portions of the volume metadata reside in memory to ensure efficient processing of the extent keys, e.g., with respect to hash table lookup operations, and redirection to appropriate extent store instances to determine whether the data exists. In addition, because it is densely packed irrespective of the I/O request, e.g., random write requests, the dense tree metadata structure supports large continuous write operations to storage and, thus, is flash friendly with respect to random write operations.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks and/or CDs) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:
1. A system comprising:
a central processing unit (CPU) of a node coupled to one or more storage devices; and
a memory coupled to the CPU and configured to store a storage input/output (I/O) stack having a volume layer executable by the CPU, the volume layer configured to manage volume metadata embodied as mappings from offsets of a logical unit (LUN) to extent keys associated with storage locations on the one or more storage devices, the volume layer further configured to organize the volume metadata as a dense tree structure representing successive points in time to enable access to the volume metadata, the dense tree structure organized as multiple levels, the volume layer further configured to maintain a staging buffer for volume metadata entries inserted into a first level of the dense tree structure, wherein each level of the dense tree structure is maintained on the one or more storage devices as a packed array of the volume metadata entries, and wherein the volume metadata entries are stored as extents organized as metadata pages.

2. The system of claim 1 wherein the metadata pages are fixed sized.

3. The system of claim 1 wherein each metadata page has a unique identifier.

4. The system of claim 1 wherein each level of the dense tree structure on the one or more storage devices comprises a header containing reference counts associated with the extents.

5. The system of claim 4 wherein a first level header associated with the first level of the dense tree structure contains a first header key that points to a second level header associated with a second level of the dense tree structure.

6. The system of claim 4 wherein the LUN is apportioned into one or more volumes and wherein each volume is partitioned into regions represented by dense tree structures.

7. The system of claim 6 further comprising a volume root extent stored on the one or more storage devices and containing region keys that point to roots of the dense tree structures for the regions of the volume.

8. The system of claim 7 wherein the volume root extent is a volume superblock.

9. The system of claim 8 wherein the roots of the dense tree structures are first level headers of the dense tree structures.

10. A method comprising:
 executing, by a processor coupled to one or more storage devices, a storage input/output (I/O) stack having a volume layer, the volume layer managing volume metadata embodied as mappings from offsets of a logical unit (LUN) to extent keys associated with storage locations on the one or more storage devices;
 organizing, by the volume layer, the volume metadata as a dense tree structure representing successive points in time to enable access to the volume metadata, the dense tree structure having multiple levels;
 maintaining, by the volume layer, a staging buffer for volume metadata entries inserted into a first level of the dense tree structure;
 maintaining, by the volume layer, each level of the dense tree structure on the one or more storage devices as a packed array of the volume metadata entries; and
 storing, by the volume layer, the volume metadata entries as extents organized as metadata pages.

11. The method of claim 10 wherein the metadata pages are fixed sized.

12. The method of claim 10 wherein each metadata page has a unique identifier.

13. The method of claim 10 wherein maintaining, by the volume layer, each level of the dense tree structure comprises maintaining a header of each level containing reference counts associated with the extents.

14. The method of claim 13 further comprising:
 storing a first header key in a first level header associated with the first level of the dense tree structure; and
 referencing a second level header associated with a second level of the dense tree structure using the first header key.

15. The method of claim 13 further comprising:
 apportioning the LUN into one or more volumes; and
 partitioning each volume into regions represented by dense tree structures.

16. The method of claim 15 further comprising:
 storing a volume root extent on the one or more storage devices; and
 referencing roots of the dense tree structures for the regions of the volume using region keys of the volume root extent.

17. The method of claim 16 wherein the volume root extent is a volume superblock.

18. The method of claim 17 wherein the roots of the dense tree structures are first level headers of the dense tree structures.

19. A non-transitory computer readable medium including program instructions for execution on one or more processors, the program instructions configured to:
 implement a storage input/output (I/O) stack having a volume layer, the volume layer to manage volume metadata embodied as mappings from offsets of a logical unit (LUN) to extent keys associated with storage locations on one or more storage devices;
 organize the volume metadata as a dense tree structure representing successive points in time to enable access to the volume metadata, the dense tree structure having multiple levels;
 maintain a staging buffer for volume metadata entries inserted into a first level of the dense tree structure;
 maintain each level of the dense tree structure on the one or more storage devices as a packed array of the volume metadata entries; and
 store the volume metadata entries as extents organized as metadata pages.

20. The non-transitory computer readable medium of claim 19 wherein the metadata pages are fixed sized.

* * * * *